United States Patent
Chung et al.

(10) Patent No.: US 10,809,551 B2
(45) Date of Patent: Oct. 20, 2020

(54) LIQUID CRYSTAL DISPLAY DEVICE HAVING SWITCHABLE VIEWING ANGLES AND VIEWING ANGLE SWITCHING METHOD THEREOF

(71) Applicant: INFOVISION OPTOELECTRONICS (KUNSHAN) CO., LTD., Kunshan, Jiangsu Province (CN)

(72) Inventors: Te-Chen Chung, Kunshan (CN); Weifeng Fan, Kunshan (CN); Peiyang Lin, Kunshan (CN); Huilong Zheng, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 16/321,035

(22) PCT Filed: Aug. 8, 2016

(86) PCT No.: PCT/CN2016/093957
§ 371 (c)(1),
(2) Date: Jan. 27, 2019

(87) PCT Pub. No.: WO2018/027478
PCT Pub. Date: Feb. 15, 2018

(65) Prior Publication Data
US 2019/0179180 A1  Jun. 13, 2019

(51) Int. Cl.
*G09G 3/36* (2006.01)
*G06F 3/038* (2013.01)
(Continued)

(52) U.S. Cl.
CPC ......... *G02F 1/1323* (2013.01); *G02F 1/1343* (2013.01); *G02F 1/133514* (2013.01);
(Continued)

(58) Field of Classification Search
CPC ............................. G06F 3/012; G06F 3/0488
See application file for complete search history.

(56) References Cited

U.S. PATENT DOCUMENTS

| 5,847,688 | A | 12/1998 | Ohi et al. |
| 2006/0262057 | A1* | 11/2006 | Sumiyoshi ............ G02F 1/1323 345/87 |

(Continued)

FOREIGN PATENT DOCUMENTS

| CN | 1866084 A | 11/2006 |
| CN | 101952876 A | 1/2011 |

(Continued)

*Primary Examiner* — Nan-Ying Yang
(74) *Attorney, Agent, or Firm* — Cheng-Ju Chiang

(57) ABSTRACT

A liquid crystal display device having switchable viewing angles includes a display panel and a display control module. The display panel includes a first substrate, a second substrate, and a liquid crystal layer between the first substrate and the second substrate. The display control module is used for controlling the display panel to display images. The first substrate is provided with a first electrode. The second substrate is provided with a second electrode and a third electrode. The liquid crystal display device further includes a viewing angle control module. The display control module is further used to provide a synchronization signal to the viewing angle control module. According to the synchronization signal, when a next frame following a current frame on which a viewing angle switching signal is received starts to display, the viewing angle control module outputs a periodic alternating voltage for switching viewing angle to the first electrode.

14 Claims, 15 Drawing Sheets

(51) Int. Cl.
   *G09G 5/00* (2006.01)
   *G09G 5/10* (2006.01)
   *G02F 1/13* (2006.01)
   *G02F 1/1343* (2006.01)
   *G02F 1/1335* (2006.01)
   *G02F 1/1362* (2006.01)
   *G09G 3/34* (2006.01)

(52) U.S. Cl.
   CPC .. G02F 1/134363 (2013.01); G02F 1/136286 (2013.01); G09G 3/36 (2013.01); G09G 3/3648 (2013.01); *G02F 2001/133519* (2013.01); *G02F 2001/134381* (2013.01); *G09G 3/3406* (2013.01); *G09G 2310/06* (2013.01); *G09G 2320/028* (2013.01); *G09G 2320/068* (2013.01); *G09G 2320/0626* (2013.01)

(56) References Cited

U.S. PATENT DOCUMENTS

| | | | |
|---|---|---|---|
| 2007/0152930 | A1 | 7/2007 | Jin et al. |
| 2010/0295827 | A1* | 11/2010 | Lim ................ G09G 3/20 345/204 |
| 2011/0006979 | A1 | 1/2011 | Min et al. |
| 2011/0032231 | A1 | 2/2011 | Maruyama et al. |
| 2014/0002761 | A1 | 1/2014 | Heo et al. |
| 2014/0184965 | A1 | 7/2014 | Xu |
| 2014/0253501 | A1* | 9/2014 | Noguchi ......... G02F 1/13338 345/174 |
| 2014/0340621 | A1* | 11/2014 | Chung ........... G02F 1/133514 349/106 |
| 2015/0138059 | A1* | 5/2015 | Large .............. G02F 1/1323 345/102 |
| 2018/0084159 | A1* | 3/2018 | Harada ............. H04N 5/225 |

FOREIGN PATENT DOCUMENTS

| | | |
|---|---|---|
| CN | 104865757 A | 8/2015 |
| CN | 105138173 A | 12/2015 |
| CN | 105446014 A | 3/2016 |
| CN | 105807511 A | 7/2016 |
| JP | H3-269415 A | 12/1991 |
| JP | H11-30783 A | 2/1999 |
| JP | 2000-89196 A | 3/2000 |
| JP | 2002-31812 A | 1/2002 |
| JP | 2006-91871 A | 4/2006 |
| JP | 2006-139315 A | 6/2006 |
| JP | 2007-148337 A | 6/2007 |
| JP | 2007-163843 A | 6/2007 |
| JP | 2007-178907 A | 7/2007 |
| JP | 2008-304715 A | 12/2008 |
| JP | 2009-109924 A | 5/2009 |
| JP | 2009-122212 A | 6/2009 |
| JP | 2010-181804 A | 8/2010 |
| JP | 2010-243968 A | 10/2010 |
| JP | 2011-170341 A | 9/2011 |
| JP | 2012-159729 A | 8/2012 |
| JP | 2014-81450 A | 5/2014 |
| JP | 2014-149335 A | 8/2014 |
| KR | 10-2011-0010429 A | 2/2011 |
| KR | 10-2016-0050705 A | 5/2016 |
| KR | 10-2016-0056493 A | 5/2016 |

* cited by examiner

AA direct current common voltage(DC Vcom)
BB alternating voltage
CC synchronization signal
DD viewing angle adjustment signal
EE viewing angle switching signal

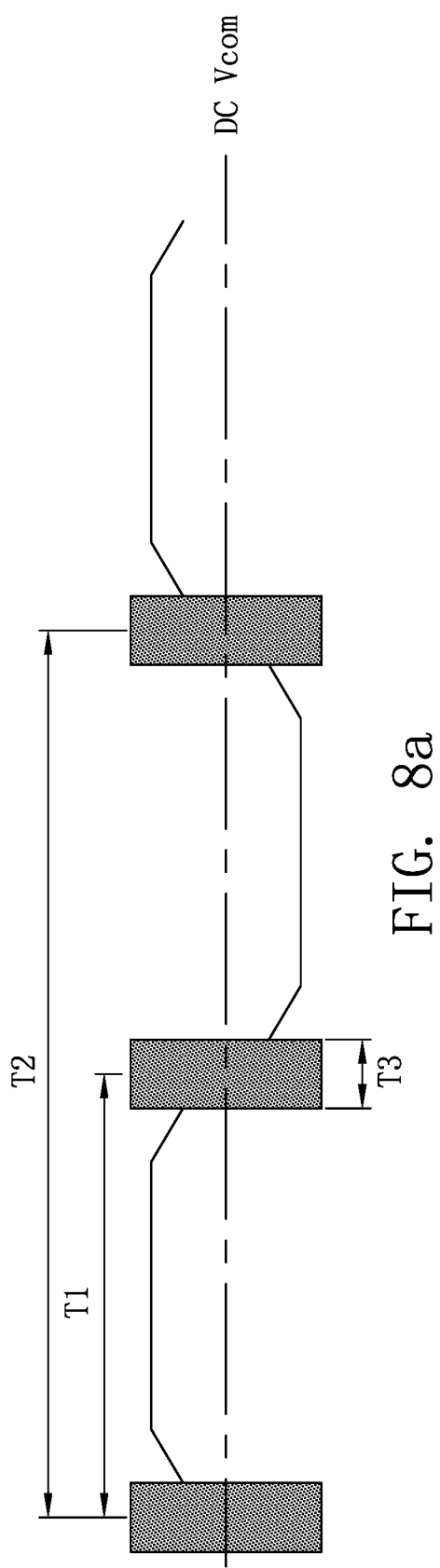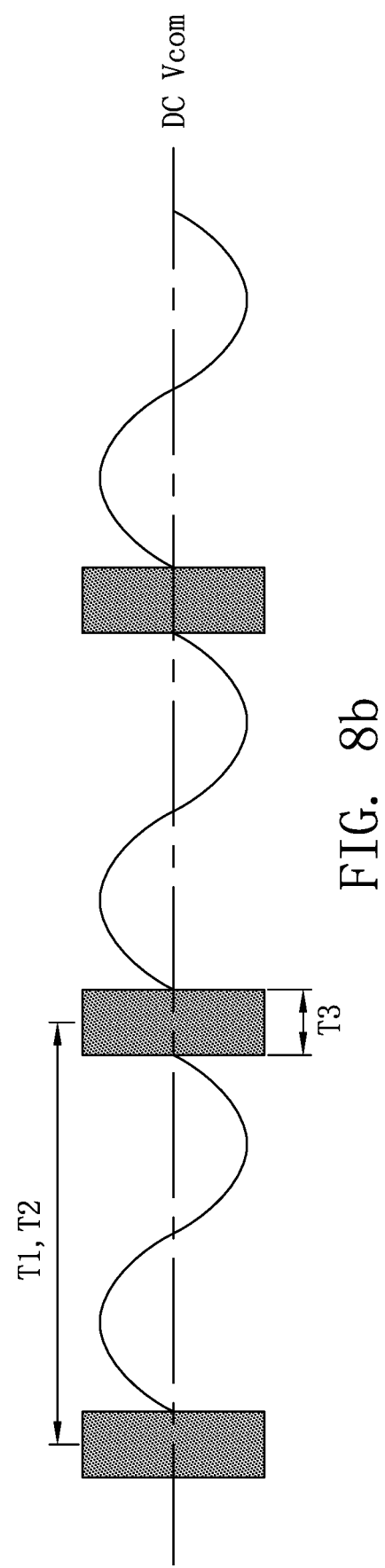
FIG. 8a
FIG. 8b

LIQUID CRYSTAL DISPLAY DEVICE HAVING SWITCHABLE VIEWING ANGLES AND VIEWING ANGLE SWITCHING METHOD THEREOF

CROSS REFERENCE TO RELATED APPLICATIONS

This application is a 35 U.S.C. §371 National Phase conversion of International (PCT) Patent Application No. PCT/CN2016/093957, filed on Aug. 8, 2016. The PCT International Patent Application was filed and published in Chinese.

TECHNICAL FIELD

The present application relates to the technical field of liquid crystal display, and more particularly to a liquid crystal display device having switchable viewing angles and a viewing angle switching method thereof.

BACKGROUND

Liquid crystal display (LCD) has the advantages of good image quality, small size, light weight, low driving voltage, low power consumption, no radiation and relatively low manufacturing cost, and is dominant in the field of flat panel display.

Nowadays, liquid crystal display devices are gradually developing towards a wide viewing angle, and liquid crystal display devices such as an in-plane switching mode (IPS) or a fringe field switching mode (FFS) can realize wide viewing angle. The wide viewing angle allows the user to see a complete, undistorted image from all directions. However, people in today's society are paying more and more attention to protecting their privacy. There are many things that do not like to share with others. In public places, people want to keep their content confidential when they use a mobile phone or browse a computer. Therefore, the display device with a single viewing angle mode has been unable to meet the needs of the user. In addition to the need for a wide viewing angle, the display device is also desirable to be switched or adjusted to a narrow viewing angle when privacy protection is required.

Currently, there are two ways to switch the wide viewing angle and the narrow viewing angle of the liquid crystal display device. The first way is to attach a louver shielding film on the screen in order to reduce the viewing angle in the need for protecting privacy. The second way is to provide a dual light source backlight system in the liquid crystal display device for adjusting the viewing angle of the liquid crystal display device. The dual light source backlight system is composed of a two-layer laminated light guide plates combined with anti-prism sheets. The top light guide plate (LGP-T) combined with the anti-prism sheet is used to change the direction of the light, so that the light is restricted to a narrow range, thereby achieving a narrow viewing angle for the liquid crystal display device, while the bottom light guide plate (LGP-B) combined with the anti-prism sheet is used for realizing a wide viewing angle for the liquid crystal display device.

However, the above first method has the drawback that needs to prepare an additional louver shielding film, which causes great inconvenience to the user, and a louver shielding film can only achieve a single viewing angle. Once a louver shielding film is attached, the viewing angle is fixed, only a narrow viewing angle mode can be realized, and the viewing angle cannot be changed according to the user's needs. The above second method has the drawback that the dual light source backlight system causes the thickness and the cost of the liquid crystal display device to increase, which is not in line with the development trend of thin and light liquid crystal display devices.

SUMMARY

The object of the present application is to provide a liquid crystal display device having switchable viewing angles and a viewing angle switching method, which can easily realize switching between a wide viewing angle and a narrow viewing angle without using a shielding film and substantially without increasing product thickness and manufacturing cost. It is easy to switch between wide and narrow viewing angles on different occasions with good operational flexibility and convenience.

An embodiment of the present application provides a liquid crystal display device having switchable viewing angles, which includes a display panel and a display control module. The display panel includes a first substrate, a second substrate disposed opposite to the first substrate, and a liquid crystal layer disposed between the first substrate and the second substrate. The display control module is used to control the display panel to display images. The first substrate is provided with a first electrode. The second substrate is provided with a second electrode and a third electrode. The liquid crystal display device further includes a viewing angle control module, and the display control module is further used to provide a synchronization signal to the viewing angle control module. According to the synchronization signal, when a next frame following a current frame on which a viewing angle switching signal is received starts to display, the viewing angle control module outputs a periodic alternating voltage for switching viewing angle to the first electrode.

Further, according to the synchronization signal, when a next frame following a current frame on which a viewing angle adjustment signal is received starts to display, the viewing angle control module further changes the waveform, the amplitude or the frequency of the periodic alternating voltage applied to the first electrode.

Further, the liquid crystal display device is provided with a viewing angle control button for the user to send a viewing angle switching signal or a viewing angle adjustment signal to the liquid crystal display device.

Further, the viewing angle control button is a physical button or a virtual button.

Further, the liquid crystal display device further includes a backlight and a backlight brightness control module, and the backlight brightness control module automatically adjusts the brightness of the backlight according to the viewing angle switching signal or the viewing angle adjustment signal.

Further, the display control module is further used to detect the images displayed on the display panel, and automatically outputs a viewing angle adjustment signal to the viewing angle control module according to the detecting result.

Further, the viewing angle control module is further used to output a direct current common voltage to the second electrode, and the alternating voltage outputted to the first electrode fluctuates around the direct current common voltage.

Further, a period of the alternating voltage outputted to the first electrode is 0.5 or $2^n$ times of the display period of each frame, wherein n=0, 1, 2, 4, 8.

Further, the alternating voltage outputted to the first electrode is a square wave, a sine wave, a triangular wave or a saw-tooth wave.

Further, the liquid crystal display device further includes a waveform storage module for storing different alternating voltage waveforms. When outputting an alternating voltage to the first electrode, the viewing angle control module selects a corresponding alternating voltage waveform from the waveform storage module and outputs it to the first electrode.

Further, the liquid crystal molecules in the liquid crystal layer are positive liquid crystal molecules, and in the initial state, the positive liquid crystal molecules are in a lying posture and the display panel has a wide viewing angle. When the alternating voltage is outputted to the first electrode, the positive liquid crystal molecules are deflected from a lying posture to a tilting posture and the display panel is switched from a wide viewing angle to a narrow viewing angle.

Further, the liquid crystal molecules in the liquid crystal layer are negative liquid crystal molecules, and in the initial state, the negative liquid crystal molecules are in a tilting posture and the display panel has a narrow viewing angle. When the alternating voltage is outputted to the first electrode, the negative liquid crystal molecules are deflected from a tilting posture to a lying posture and the display panel is switched from a narrow viewing angle to a wide viewing angle.

Further, the second substrate is provided with scanning lines and data lines, wherein a plurality of scanning lines and a plurality of data lines intersect each other to define a plurality of sub-pixel regions. The first substrate is further provided with a metal conductive layer. The metal conductive layer includes a plurality of metal conductive strips, and the metal conductive strips are in direct conductive contact with the first electrode.

Further, the first substrate further includes a color filter layer, a black matrix, a first overcoat layer and a second overcoat layer. The color filter layer and the black matrix are staggered from each other and formed on a surface of the first substrate facing towards the liquid crystal layer. The first overcoat layer covers the color filter layer and the black matrix. The first electrode is formed on the first overcoat layer. The metal conductive layer is formed on the first electrode and overlapped with the black matrix, and the second overcoat layer covers the metal conductive layer.

Further, the first substrate further includes a color filter layer, a black matrix and an overcoat layer. The black matrix is formed on a surface of the first substrate facing towards the liquid crystal layer. The first electrode is formed on the black matrix. The color filter layer is formed on the first electrode and staggered from the black matrix. The metal conductive layer is formed on the first electrode and overlapped with the black matrix, and the overcoat layer covers the metal conductive layer and the color filter layer.

An embodiment of the present application further provides a viewing angle switching method of a liquid crystal display device. The liquid crystal display device includes a display panel. The display panel includes a first substrate, a second substrate disposed opposite the first substrate and a liquid crystal layer disposed between the first substrate and the second substrate. The first substrate is provided with a first electrode. The second substrate is provided with a second electrode and a third electrode.

The viewing angle switching method includes: outputting a periodic alternating voltage for switching the viewing angle to the first electrode of the first substrate when a next frame following a current frame on which a viewing angle switching signal is received starts to display.

Further, the viewing angle switching method further includes: changing the waveform, the magnitude, or the frequency of the alternating voltage applied to the first electrode when a next frame following a current frame on which a viewing angle adjustment signal is received starts to display.

Further, the liquid crystal display device is provided with a viewing angle control button for the user to send a viewing angle switching signal or a viewing angle adjustment signal to the liquid crystal display device.

Further, the viewing angle switching method further includes: detecting the images displayed on the display panel, and automatically generating a viewing angle adjustment signal according to the detecting result.

Further, the viewing angle switching method further includes: outputting a direct current common voltage to the second electrode, wherein the alternating voltage outputted to the first electrode fluctuates around the direct current common voltage.

In the liquid crystal display device having switchable viewing angles and the viewing angle switching method provided by the embodiments of the present application, the first electrode for controlling the viewing angle is provided on the first substrate, and by applying an alternating bias voltage to the first electrode, the display panel can switch between wide and narrow viewing angles. When receiving a viewing angle switching signal from the user, it is waited until the display of the current frame is finished according to the synchronization signal provided by the display control module. When a next frame following the current frame starts to display, a periodic alternating voltage for switching viewing angle is applied to the first electrode, for realizing the switching of the viewing angle. Since the viewing angle is switched at the beginning of display of one frame, the voltage on the first electrode is constant on each frame, to avoid voltage inconsistency on the first electrode between the first half and the second half of a frame, so that problems such as flicker and mura caused by sudden change of voltage on the first electrode are eliminated. The embodiments of the present application can easily realize switching between wide and narrow viewing angles with good operational flexibility and convenience, without the need to use a shielding film and without increasing the product thickness and the manufacturing cost. Thus, a multi-functional liquid crystal display device with the advantages of entertainment use and privacy protection is obtained.

BRIEF DESCRIPTION OF THE DRAWINGS

FIG. 8a to FIG. 8e are waveforms of an alternating voltage outputted to the first electrode in different examples of the present application.

DETAILED DESCRIPTION OF PREFERRED EMBODIMENTS

Figure 1:
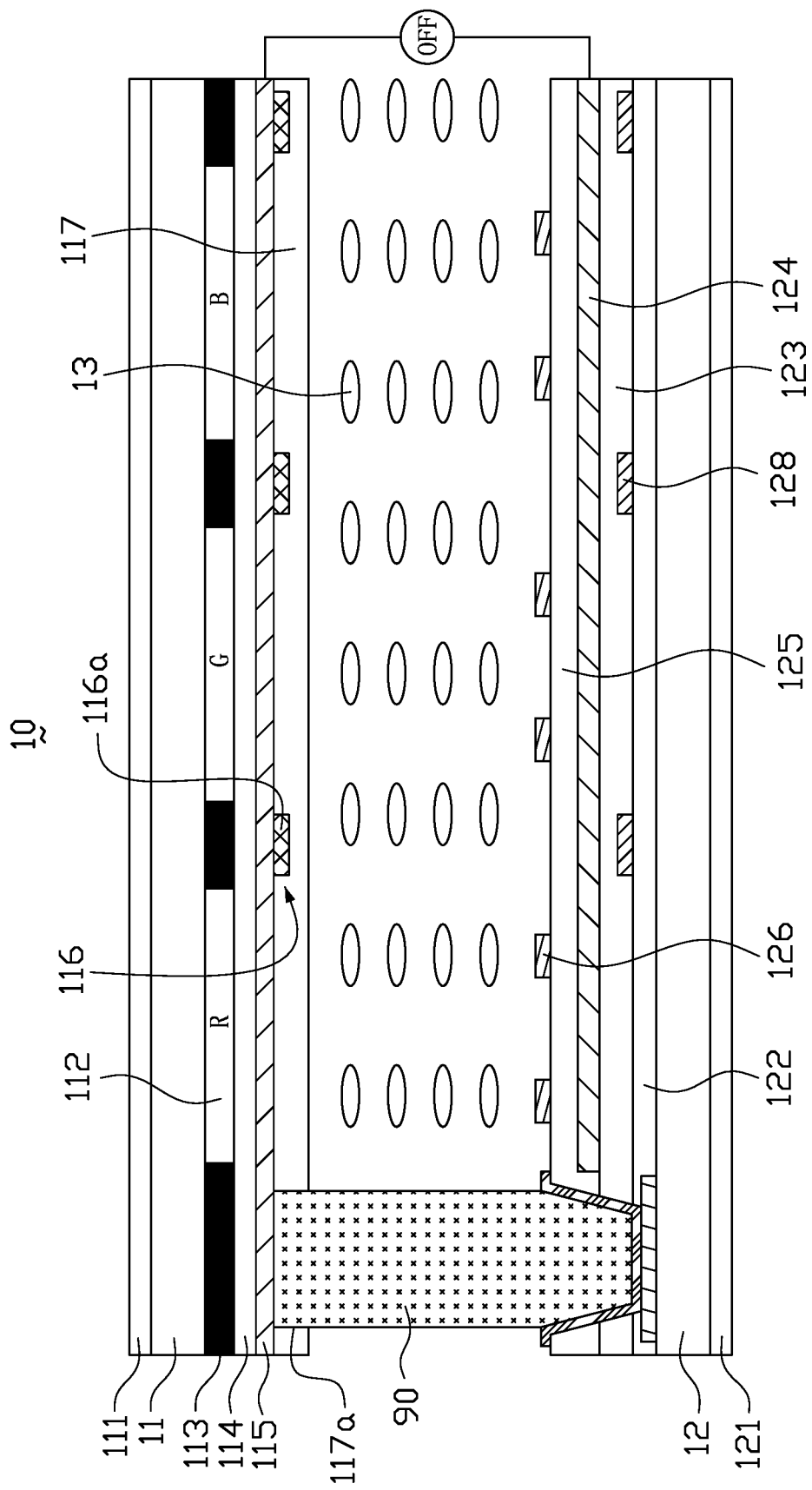
FIG. 1 is a schematic view of a liquid crystal display device in a wide viewing angle mode according to a first embodiment of the present application.

In order to make the objects, technical solutions and advantages of the present application much clearer, embodiments of the present application will be further described with reference to the accompanying drawings.

In the drawings, the size of layers and regions may be exaggerated for purpose of clarity. It will be understood that when an element such as a layer, region or substrate is referred to as being "formed on", "disposed on" or "located on" another element, the element can be directly disposed on the other element or there may be intermediate elements. In contrast, when an element is referred to as being "directly formed on" or "directly disposed on" another element, there is no intermediate element.

First Embodiment

Figure 2:
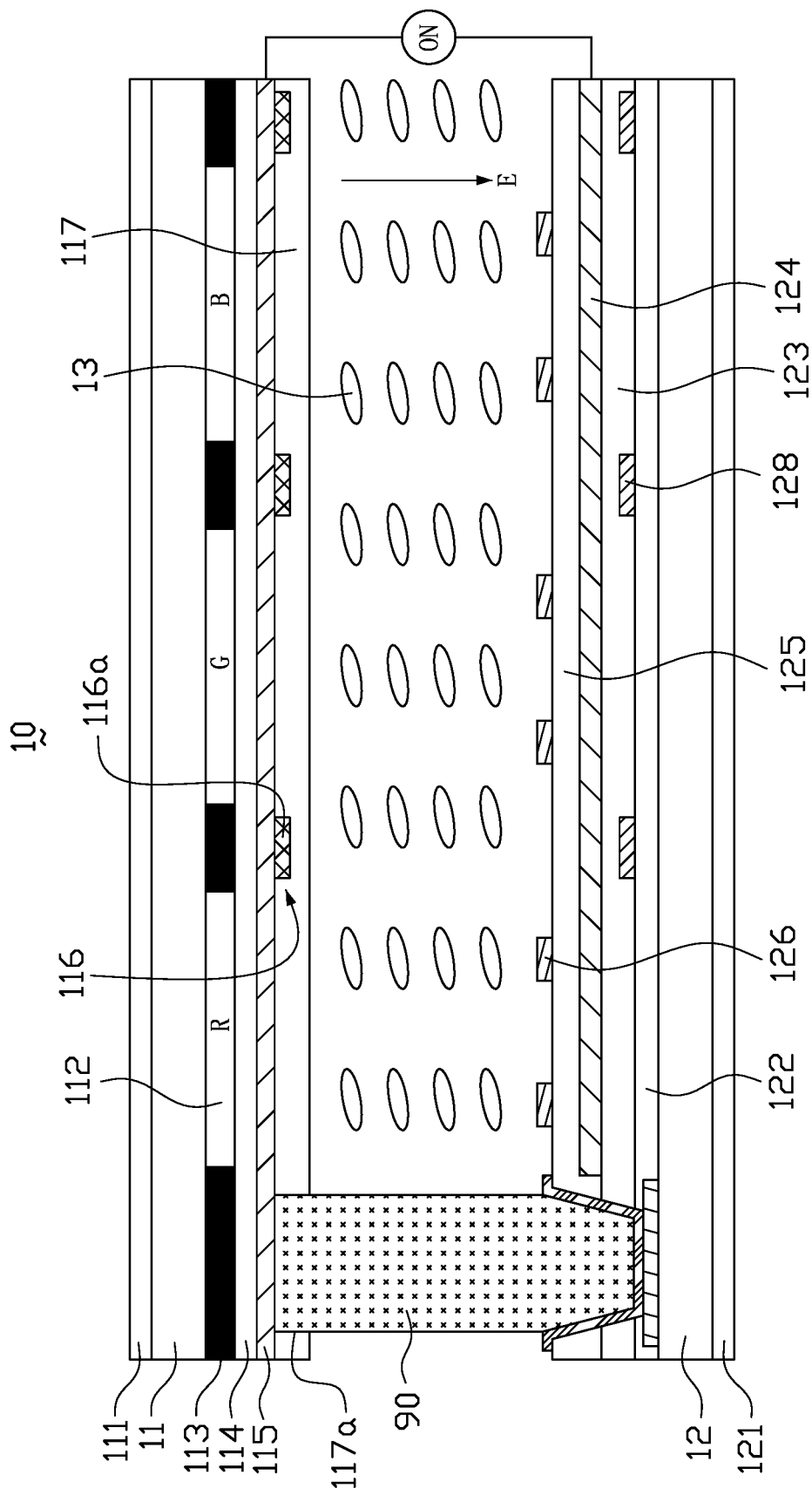
FIG. 2 is a schematic view of the liquid crystal display device of FIG. 1 in a narrow viewing angle mode.

FIG. 1 is a schematic view of a liquid crystal display device in a wide viewing angle mode according to a first embodiment of the present application, and FIG. 2 is a schematic view of the liquid crystal display device of FIG. 1 in a narrow viewing angle mode. Referring to FIG. 1 and FIG. 2, the liquid crystal display device includes a display panel 10. The display panel 10 includes a first substrate 11, a second substrate 12 disposed opposite to the first substrate 11, and a liquid crystal layer 13 disposed between the first substrate 11 and the second substrate 12.

In general, when a user views a screen of a liquid crystal display device from different viewing angles, the contrast of the image decreases as the viewing angle increases. In a conventional twisted nematic (TN) type liquid crystal display device, common electrode and pixel electrode are respectively formed on upper and lower substrates, and liquid crystal molecules are rotated in a plane perpendicular to the substrates. However, in the TN type liquid crystal display device, the liquid crystal molecules adjacent to the surfaces of the two substrates are arranged orthogonally to each other, and as a result, the viewing angle is narrow for the TN type liquid crystal display device. In order to achieve wide viewing angle, liquid crystal display devices of in-plane switching (IPS) using a horizontal electric field and fringe field switching (FFS) using a fringe electric field have been developed. For the IPS type or FFS type liquid crystal display device, the common electrode and the pixel electrode are formed on the same substrate (i.e., the TFT array substrate), and the liquid crystal molecules are rotated in a plane substantially parallel to the substrates to obtain a wider viewing angle.

The liquid crystal display device in this embodiment is applicable to in-plane switching (IPS) type or fringe field switching (FFS) type liquid crystal display device, and the common electrode and the pixel electrode are formed on the same substrate (i.e., TFT array substrate). When an electric field is applied between the common electrode and the pixel electrode for display, the liquid crystal molecules are rotated in a plane substantially parallel to the substrates to obtain a wide viewing angle. In this embodiment, the liquid crystal display device will be described by taking fringe field switching (FFS) type as an example.

In this embodiment, the first substrate 11 is, for example, a color filter substrate, and the second substrate 12 is, for example, a TFT array substrate. The first substrate 11 is provided with a first polarizer 111 on the surface facing away from the liquid crystal layer 13. The second substrate 12 is provided with a second polarizer 121 on the surface facing away from the liquid crystal layer 13. The light transmission axis of the first polarizer 111 is perpendicular to that of the second polarizer 121.

In this embodiment, the first substrate 11 is provided with a color filter layer 112, a black matrix (BM) 113, a first overcoat layer 114, a first electrode 115, a metal conductive layer 116 and a second overcoat layer 117 on the surface facing towards the liquid crystal layer 13. In this embodiment, the color filter layer 112 and the black matrix 113 are staggered from each other and formed on the surface of the first substrate 11 facing towards the liquid crystal layer 13. The first overcoat layer 114 covers the color filter layer 112 and the black matrix 113. The first electrode 115 is formed on the first overcoat layer 114. The metal conductive layer 116 is formed on the first electrode 115 and overlapped with the black matrix 113. The second overcoat layer 117 covers the metal conductive layer 116. However, the present application is not limited thereto, and the structures and arrangements between the respective layers can be appropriately adjusted as required.

The color filter layer 112 includes, for example, red (R), green (G), and blue (B) color resist materials, for respectively corresponding to red, green, and blue sub-pixels. Multiple adjacent sub-pixels constitute one pixel for display. For example, each pixel may include three sub-pixels of red (R), green (G), and blue (B), but the present application is not limited thereto. The black matrix 113 is disposed between the red, the green, and the blue sub-pixels, so that adjacent sub-pixels are spaced apart from each other by the black matrix 113. The first overcoat layer 114 is used to planarize the surfaces of the color filter layer 112 and the black matrix 113, and the second overcoat layer 117 is used to planarize the surface of the metal conductive layer 116.

In this embodiment, the second substrate 12 is provided with a gate insulating layer 122, an insulating protective layer 123, a second electrode 124, an intermediate insulating layer 125 and a third electrode 126 on the surface facing towards the liquid crystal layer 13. In this embodiment, the gate insulating layer 122 is formed on the surface of the second substrate 12 facing towards the liquid crystal layer 13. The insulating protective layer 123 is formed on the gate insulating layer 122 for covering thin film transistors (TFT, see FIG. 3). The second electrode 124 is formed on the insulating protective layer 123. The intermediate insulating layer 125 is formed on the second electrode 124. The third electrode 126 is formed on the intermediate insulating layer 125. However, the present application is not limited thereto, and the structures and arrangements between the respective layers can be adjusted as required.

The first electrode 115, the second electrode 124 and the third electrode 126 are transparent electrodes made of a transparent material such as indium tin oxide (ITO) or indium zinc oxide (IZO). The first electrode 115 is a viewing angle control electrode for being applied with a bias voltage to control switching of viewing angle. The second electrode 124 is a common electrode for being applied with a common voltage (Vcom) for image display. The third electrode 126 is a pixel electrode formed in each sub-pixel region P (see FIG. 3). In this embodiment, the third electrode 126 is disposed above the second electrode 124, with the intermediate insulating layer 125 disposed therebetween, but it is not limited thereto. In other embodiments, the third electrode 126 may also be disposed below the second electrode 124.

The first electrode 115 may be a surface electrode which is not patterned (see FIG. 1). The second electrode 124 may be a partially patterned surface electrode (see FIG. 1), such as the second electrode 124 is partially etched away at the positions where the TFTs are formed on the second substrate 12, so that the pixel electrode (i.e., the third electrode 126) can be connected downwardly to a corresponding TFT through the etched position. The third electrode 126 (i.e., the pixel electrode) in each sub-pixel region P may be a bulk electrode or include a plurality of electrode strips connected together (see FIG. 1).

In addition, when the liquid crystal display device adopts the mode of an in-plane switching (IPS), the second electrode 124 and the third electrode 126 may be disposed in the same layer and insulated from each other. For example, the second electrode 124 and the third electrode 126 each may be a comb-shaped structure having a plurality of electrode strips mutually inserted with each other.

Figure 3:
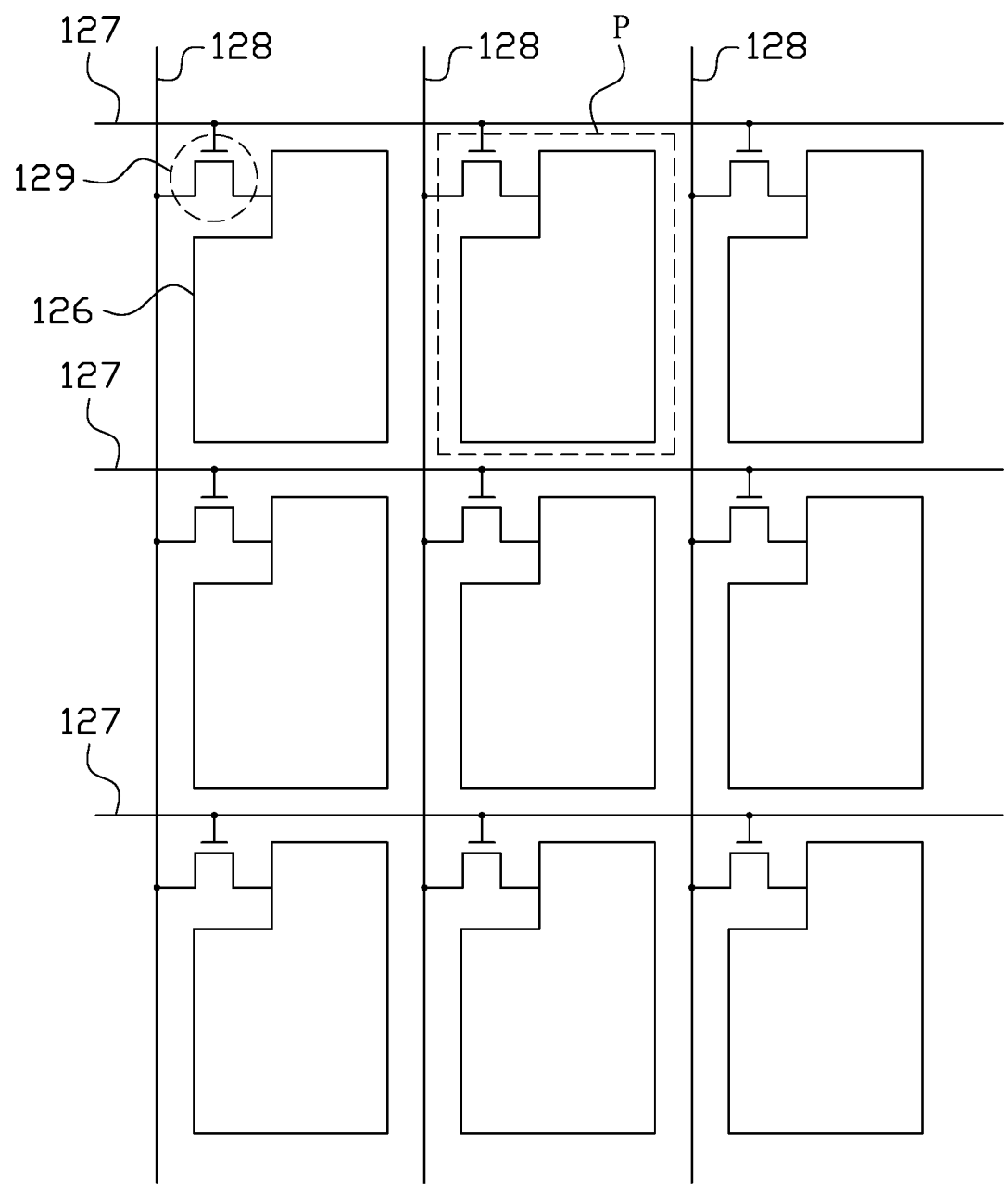
FIG. 3 is a circuit diagram of the second substrate of the liquid crystal display device of FIG. 1.

FIG. 3 is a circuit diagram of the second substrate of the liquid crystal display device of FIG. 1. Referring also to FIG. 3, the second substrate 12 is further provided with scanning lines 127 and data lines 128, wherein a plurality of scanning lines 127 and a plurality of data lines 128 are intersected with each other to define a plurality of sub-pixel regions P. Each sub-pixel region P is formed as a sub-pixel of the liquid crystal display device, and the sub-pixels of the liquid crystal display device are arranged in rows and columns. A pixel electrode (i.e., the third electrode 126) and a thin film transistor (TFT) 129 are disposed in each sub-pixel region P, and the thin film transistor 129 is located near a position where the scanning line 127 and the data line 128 are intersected. The thin film transistor 129 includes a gate electrode, an active layer, a source electrode and a drain electrode (not shown), wherein the gate electrode is electrically connected to a corresponding scanning line 127, the source electrode and the drain electrode are spaced apart from each other and in contact with the active layer, one of the source electrode and the drain electrode is electrically connected to a corresponding data line 128, and the other one of the source electrode and the drain electrode is electrically connected to a corresponding pixel electrode (i.e., the third electrode 126). For example, the source electrode is electrically connected to a corresponding data line 128, and the drain electrode is electrically connected to a corresponding pixel electrode (i.e., the third electrode 126).

The gate insulating layer 122 is formed on the surface of the second substrate 12 facing towards the liquid crystal layer 13 and covers the scanning lines 127 and the gate electrodes of the thin film transistors 129. The insulating protective layer 123 is located on the gate insulating layer 122 and covers the data lines 128 and the source electrodes and the drain electrodes of the thin film transistors 129. The intermediate insulating layer 125 is disposed between the second electrode 124 (i.e., the common electrode) and the third electrode 126 (i.e., the pixel electrode) for the purpose of insulating.

The metal conductive layer 116 may be made of a metal or an alloy of Cr, W, Ti, Ta, Mo, Al, Cu, etc., and formed directly on the surface of the first electrode 115. The metal conductive layer 116 includes a plurality of strip-shaped metal conductive strips 116a. These metal conductive strips 116a are in direct conductive contact with the first electrode 115.

Figure 4A:
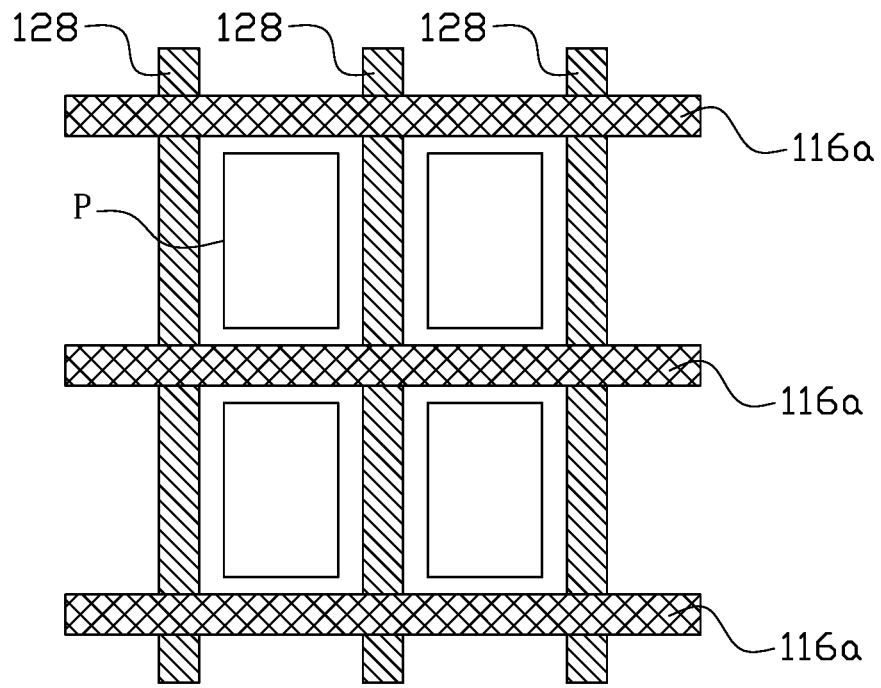
FIG. 4a to FIG. 4c are schematic views showing the pattern structure of the metal conductive layer in different examples of the present application.

In one example, referring to FIG. 4a, the metal conductive strips 116a are located directly above the respective scanning lines 127 and extend along the direction in which the scanning lines 127 extend. Preferably, the metal conductive strips 116a have the same number as the scanning lines 127, that is, each metal conductive strip 116a is aligned with a scanning line 127, two adjacent metal conductive strips 116a are spaced apart by the width of a row of sub-pixels.

Figure 4B:
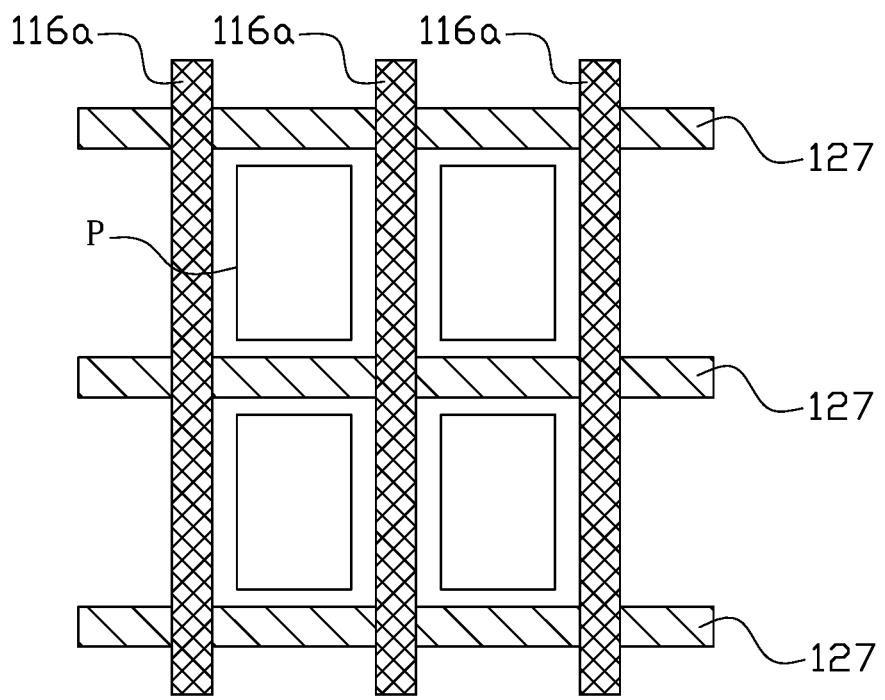

In another example, referring to FIG. 4b, the metal conductive strips 116a are located directly above the respective data lines 128 and extend along the direction in which the data lines 128 extend (see also FIG. 1). Preferably, the metal conductive strips 116a have the same number as the data lines 128, that is, each metal conductive strip 116a is aligned with a data line 128, two adjacent metal conductive strips 116a are spaced apart by the width of a column of sub-pixels.

Figure 4C:
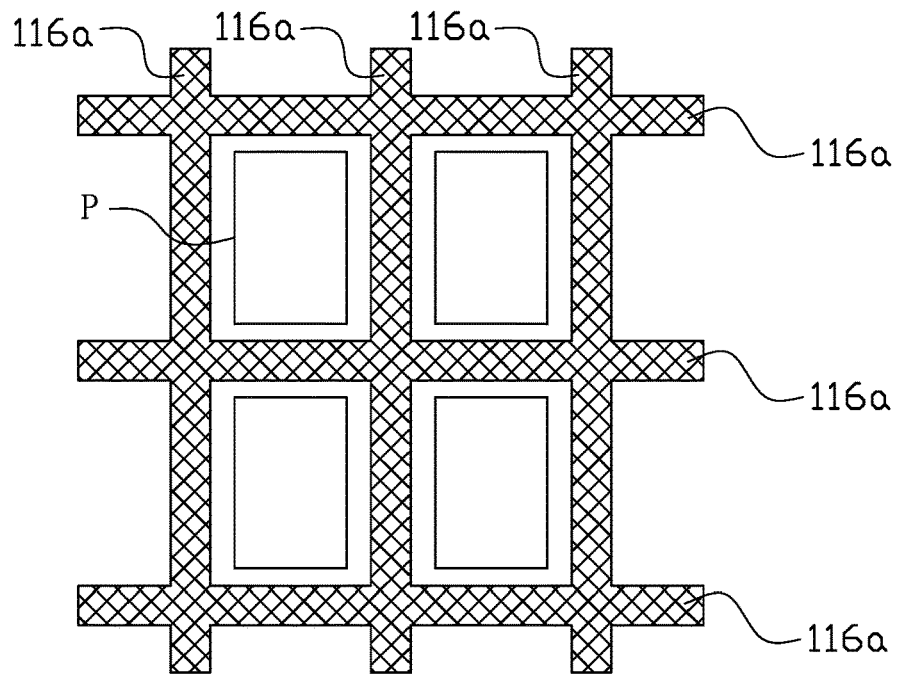

In a further example, referring to FIG. 4c, the metal conductive strips 116a are located directly above the respective data lines 128 and the respective scanning lines 127 simultaneously, and extend along the direction in which the data lines 128 and the scanning lines 127 extend. That is, the metal conductive strips 116a are intersected with each other to form a mesh structure. Preferably, the metal conductive strips 116a extending along the direction of the data lines 128 have the same number as the data lines 128, such that a metal conductive strip 116a is disposed directly above each data line 128. The metal conductive strips 116a extending along the direction of the scanning lines 127 have the same number as the scanning lines 127, such that a metal conductive strip 116a is disposed directly above each scanning line 127. The mesh structure formed by intersection of these metal conductive strips 116a may have the same pattern as the black matrix 113.

As shown in FIG. 1, these metal conductive strips 116a are located below the black matrix 113 and covered by the black matrix 113. Preferably, the line width of the metal conductive strips 116a is smaller than the line width of the black matrix 113, such that the metal conductive strips 116a are completely covered by the black matrix 113. Although the metal conductive strips 116a are made of metal and are opaque, since they are disposed directly below the black matrix 113, the aperture ratio of each sub-pixel region P is therefore not affected by the metal conductive strips 116a, and the transmittance of the liquid crystal display device is also not affected.

Liquid crystal molecules are generally divided into positive liquid crystal molecules and negative liquid crystal molecules. In this embodiment, the liquid crystal molecules in the liquid crystal layer 13 are positive liquid crystal molecules, and the positive liquid crystal molecules have the advantage of fast response. In the initial state (i.e., no voltage is applied to the display panel 10), the positive liquid crystal molecules in the liquid crystal layer 13 assume a lying posture in parallel to the substrates 11, 12, with the long-axis direction of the positive liquid crystal molecules being substantially parallel to the substrates 11, 12 (see FIG. 1). Due to the anchoring action of alignment films (not shown), the positive liquid crystal molecules are maintained with the lying posture in the initial state with no any voltage being applied to the display panel 10. In practical applications, the positive liquid crystal molecules in the liquid crystal layer 13 may have a small initial pretilt angle relative to the substrates 11, 12, and the initial pretilt angle may be in the range from greater than or equal to 0 degrees and less than or equal to 5 degrees, namely, $0°≤θ≤5°$. Under the action of an electric field generated by a voltage, the long axis of the positive liquid crystal molecules will deflect towards a direction parallel to the direction of the electric field lines.

By controlling a bias voltage applied to the first electrode 115, the liquid crystal display device may switch between a wide viewing angle mode and a narrow viewing angle mode. The "bias voltage" described hereinafter is the voltage difference between the first electrode 115 (i.e., the viewing angle control electrode) and the second electrode 124 (i.e., the common electrode).

Referring to FIG. 1, when nearly no bias voltage is applied to the first electrode 115 (including the cases in which a small bias voltage is applied, such as less than 0.5V), the tilt angle of the liquid crystal molecules is almost unchanged. The liquid crystal molecules are driven by an in-plane electric field in the conventional way, in which an in-plane electric field is formed between the pixel electrode (i.e., the third electrode 126) and the common electrode (i.e., the second electrode 124) provided on the same substrate (i.e., the second substrate 12) to drive the liquid crystal molecules to rotate in a plane parallel to the substrates 11, 12. The liquid crystal molecules achieve a wide viewing angle mode under the action of a strong in-plane electric field.

Referring to FIG. 2, when a bias voltage with a certain value is applied to the first electrode 115, a voltage difference exists between the first electrode 115 of the first substrate 11 and the second electrode 124 of the second substrate 12, and a vertical electric field is formed between the two substrates 11, 12 (as indicated by the arrow E). Since the positive liquid crystal molecules will deflect towards a direction parallel to the electric field lines under an electric field, the positive liquid crystal molecules are deflected under the action of the vertical electric field, to increase the tilt angle between the liquid crystal molecules and the substrates 11, 12. After the liquid crystal molecules are deflected, the light passing through the liquid crystal molecules in the squint direction of the display panel 10 is not matched with the upper and lower polarizers 111, 121 due to phase delay, and a light leakage occurs. When the display panel 10 is viewed from the squint direction, the contrast of the screen is lowered to affect the viewing effect, and the viewing angle is reduced, thereby achieving a narrow viewing angle mode.

Figure 5:
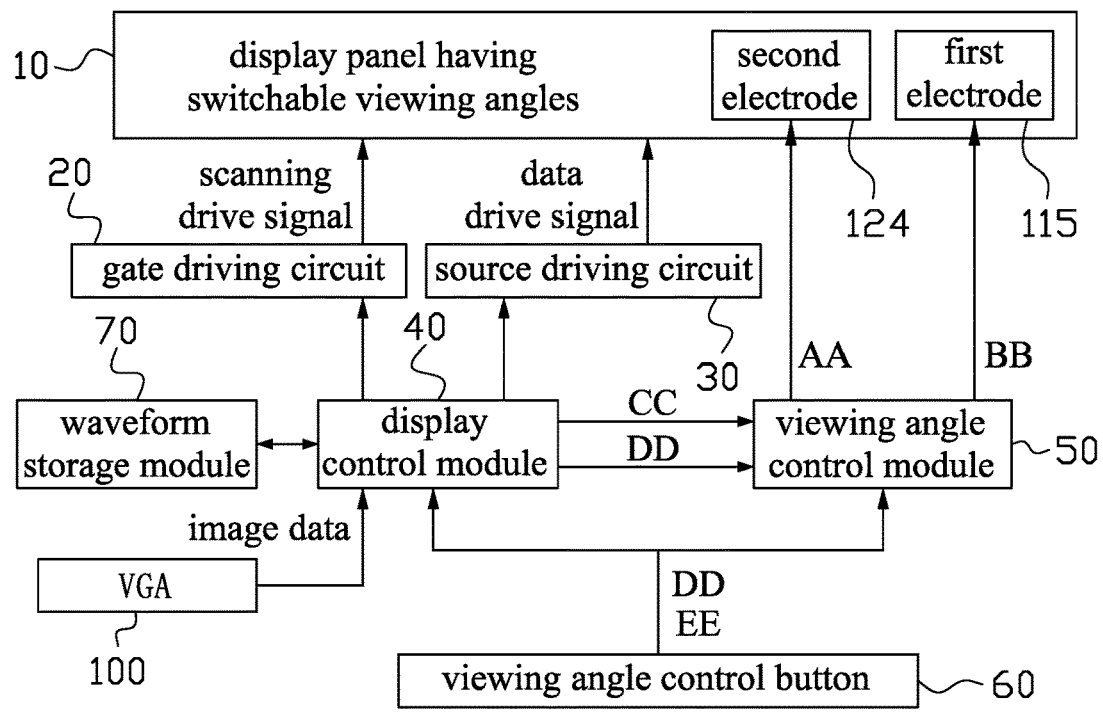
FIG. 5 is a block diagram of the working principle of the liquid crystal display device of FIG. 1.
Figure 6:
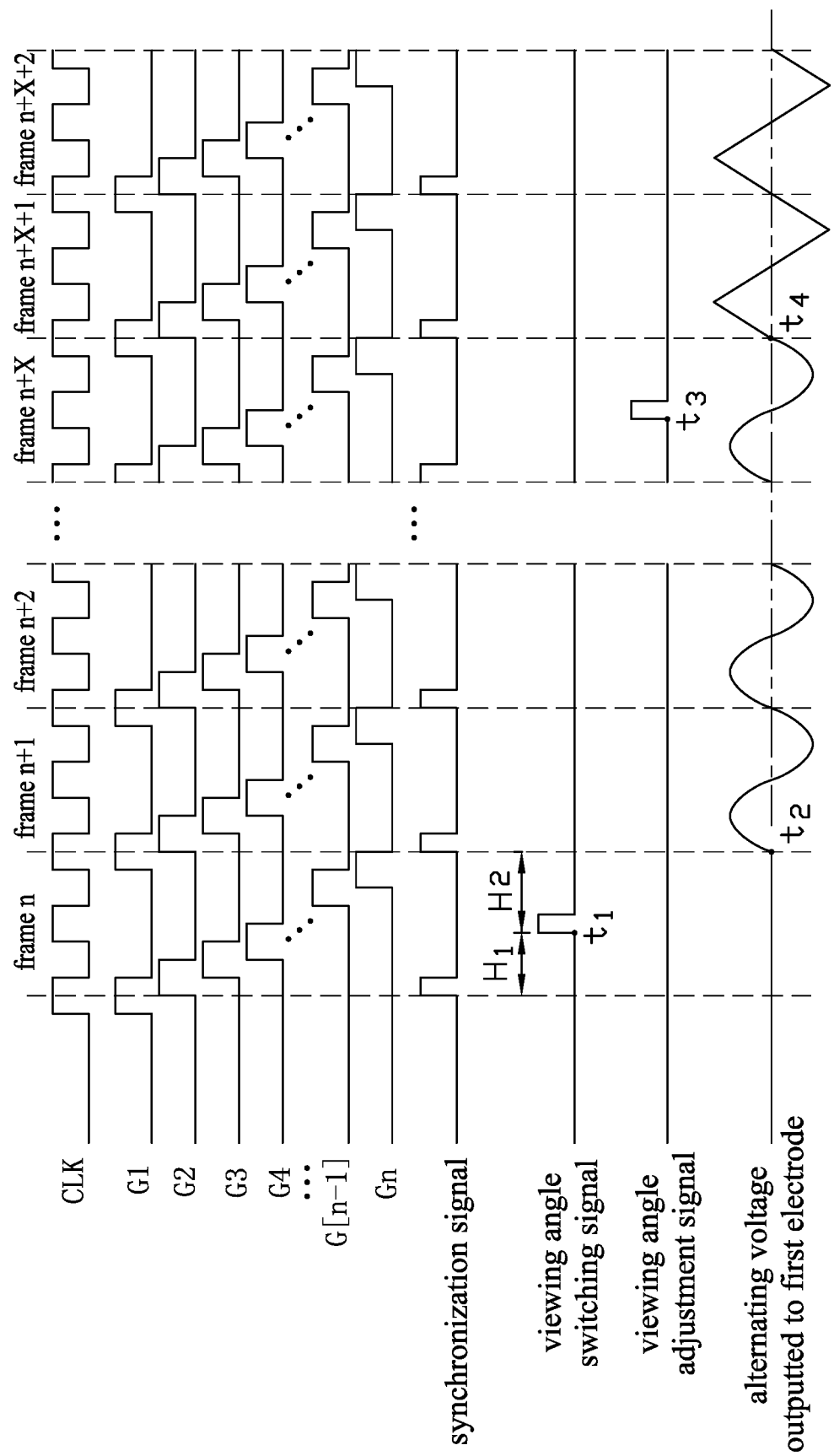
FIG. 6 is a schematic diagram of the driving timing of the liquid crystal display device of FIG. 1.

FIG. 5 is a block diagram showing the working principle of the liquid crystal display device of FIG. 1. FIG. 6 is a schematic diagram of the driving timing of the liquid crystal display device of FIG. 1. Referring to FIG. 5 and FIG. 6, the liquid crystal display device further includes a gate driving circuit 20, a source driving circuit 30, a display control module 40 and a viewing angle control module 50.

The display control module 40 may specifically be a timing controller (T-CON) or an application specific integrated circuit (ASIC). The display control module 40 is used to control the display panel 10 to display images. Specifically, after the display control module 40 processes the image data from the video graphics accelerator (VGA) 100, the display control module 40 controls the gate driving circuit 20 to sequentially send out scanning drive signals to the respective scanning lines 127, to turn on the TFTs of each row. When the TFTs of each row are turned on, the display control module 40 controls the source driving circuit 30 to send out data drive signals to the respective data lines 128 for charging a whole row of sub-pixels with respective required voltages. When all sub-pixels are charged, the display of one frame is finished. Thereafter, the above process of display is repeated to continuously refresh the images, the refresh frequency for the images is, for example, 60 Hz (i.e., refreshing 60 times per second), to thereby realize continuous image display on the screen.

As shown in FIG. 5 and FIG. 6, during the display process, the display control module 40 is further used to provide a synchronization signal to the viewing angle control module 50, the synchronization signal may be a frame synchronization signal. According to the synchronization signal, when a next frame following a current frame on which a viewing angle switching signal is received starts to display, the viewing angle control module 50 outputs a periodic alternating voltage for switching viewing angle to the first electrode 115.

That is, the user can send a viewing angle switching signal to the liquid crystal display device. Upon receiving the viewing angle switching signal, the viewing angle control module 50 does not immediately output a periodic alternating voltage for switching the viewing angle to the first electrode 115, but waiting for the display of the current frame is finished and when the next frame starts to display, the viewing angle control module 50 begins to output the periodic alternating voltage for switching the viewing angle to the first electrode 115.

An example is given below. Referring to FIG. 6, during the display of the (n)th frame, if a viewing angle switching signal is received at a certain time (e.g., at time t1) on the (n)th frame, the view angle control module 50 does not immediately outputs the alternating voltage to the first electrode 115, but waiting for the display of the (n)th frame is finished, and when the (n+1)th frame starts to display (i.e., at time t2), the viewing angle control module 50 begins to output the alternating voltage for switching the viewing angle to the first electrode 115, so that the display panel 10 is switched from the wide viewing angle mode to the narrow viewing angle mode. That is, during the display process, the display control module 40 continuously sends the synchronization signal to the viewing angle control module 50. When receiving a viewing angle switching signal on a current frame, the viewing angle control module 50 selects to output an alternating voltage for switching the viewing angle to the first electrode 115 when the display of the current frame is finished and a next frame starts to display, according to the synchronization signal provided by the display control module 40, for realizing the switching between wide and narrow viewing angles.

If the viewing angle switching signal is received at time t1 and the alternating voltage is outputted to the first electrode 115 immediately at time t1, since there is no voltage applied to the first electrode 115 during the first half H1 of the (n)th frame, a sudden change of voltage will be resulted on the first electrode 115 between the first half H1 and the second half H2 of the (n)th frame. This sudden change of voltage occurs during the display of the (n)th frame (i.e., between the first half H1 and the second half H2), which will lead to uneven display between the first half of H1 and the second half of H2, thereby easily causing flicker and mura problems.

In the embodiment of the present application, when the viewing angle switching signal is received at time t1, the alternating voltage is not outputted to the first electrode 115 immediately at time t1, but according to the synchronization signal provided by the display control module 40, it is waited until the display of the (n)th frame is finished, and when the (n+1)th frame starts to display (i.e., at time t2), the alternating voltage is outputted to the first electrode 115 to realize switching between wide and narrow viewing angles. By switching the viewing angle at the beginning of display of one frame, the sudden change of voltage on the first electrode 115 is avoided during the display of one frame, to ensure the voltage on the first electrode 115 is constant during the display of each frame. Consequently, the display of each frame is uniform, thereby eliminating flicker and mura problems caused by the sudden change of voltage on the first electrode 115.

Furthermore, referring to FIG. 5 and FIG. 6, in the narrow viewing angle mode, the user may further send a viewing angle adjustment signal to the liquid crystal display device. According to the synchronization signal, when a next frame following a current frame on which a viewing angle adjustment signal is received starts to display, the viewing angle control module 50 changes the waveform, the amplitude or the frequency of the periodic alternating voltage applied to the first electrode 115, in order to further satisfy the user's self-adjustment requirements for viewing angle besides the switching between wide and narrow viewing angles. For example, after the alternating voltage with a certain waveform has been applied to the first electrode 115 to realize a narrow viewing angle mode with a certain angle (e.g., 45°), if the user wants to further reduce the viewing angle from 45° to 35°, the user may send a viewing angle adjustment signal to the liquid crystal display device, and the viewing angle control module 50 changes the waveform, the amplitude or the frequency of the alternating voltage applied to the first electrode 115 according to the viewing angle adjustment signal, to thereby reduce the viewing angle to 35°.

When changing the waveform, the amplitude or the frequency of the alternating voltage applied to the first electrode 115 according to the viewing angle adjustment signal, it is also waited for the display of the current frame is finished and when the next frame starts to display, the viewing angle control module 50 begins to change the waveform, the amplitude or the frequency of the periodic alternating voltage applied to the first electrode 115. As shown in FIG. 6, if a viewing angle adjustment signal sent from the user is received at a certain time (e.g., at time t3) on the (n+x)th frame, the viewing angle control module 50 begins to change the waveform, the amplitude or the frequency of the alternating voltage applied to the first electrode 115 when the next frame (i.e., (n+x+1)th frame) starts to display (i.e., at time t4) according to the viewing angle adjustment signal and the synchronization signal, to avoid changing the waveform, the amplitude or the frequency of the alternating voltage during the display process of one frame and causing flicker and mura problems due to a sudden change of voltage on the first electrode 115. For example, the voltage applied to the first electrode 115 can be changed from the original sinusoidal waveform to the triangular waveform at time t4, to realize the adjustment of viewing angle. Therefore, in the narrow viewing angle mode, this embodiment can further realize the viewing angle adjustment according to the user's own requirements, thereby improving the user experience and extent of satisfaction.

Figure 7A:
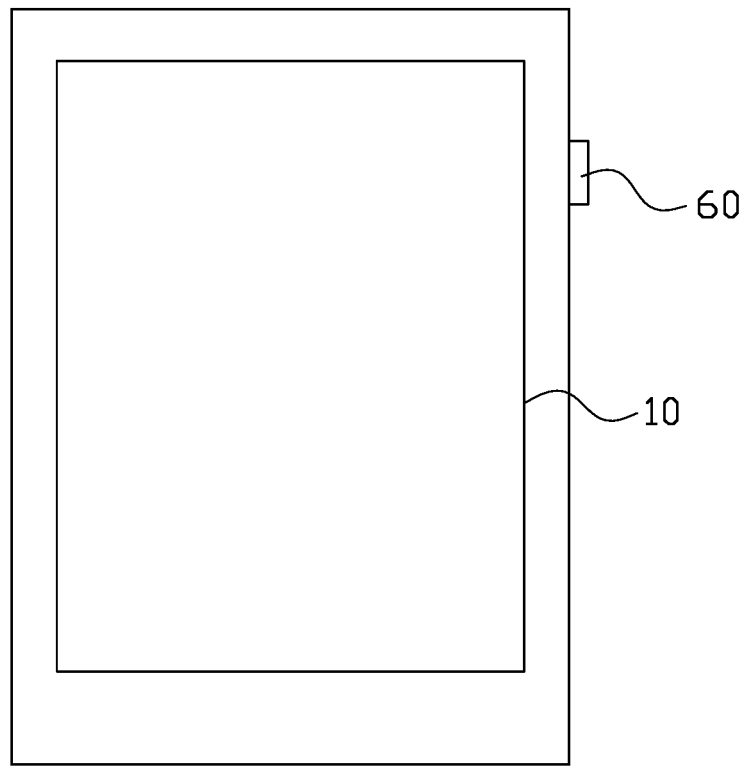
FIG. 7a to FIG. 7b are schematic views of the planar structure of the liquid crystal display device of FIG. 1.
Figure 7B:
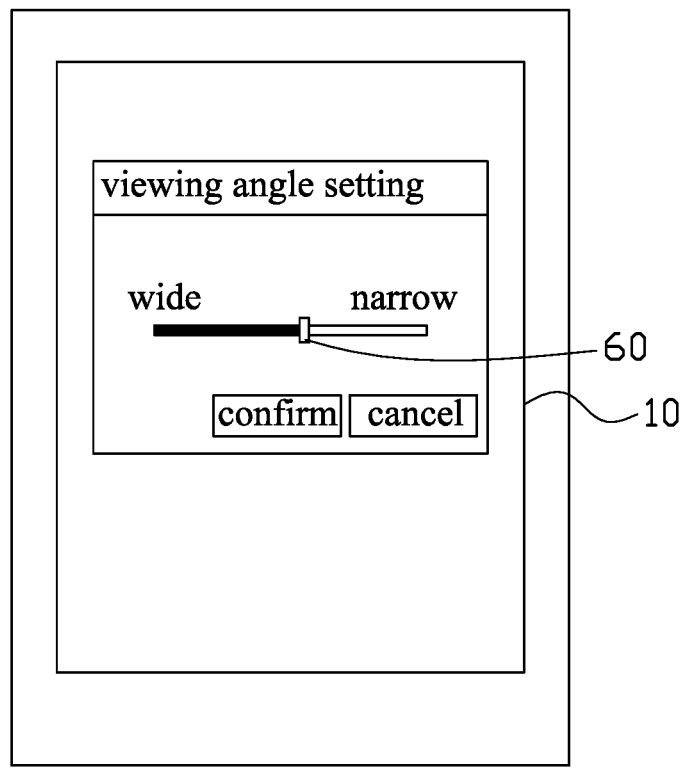

FIG. 7a to FIG. 7b are schematic views of the planar structure of the liquid crystal display device of FIG. 1. Referring to FIG. 7a to FIG. 7b, the liquid crystal display device is provided with a viewing angle control button 60 for the user to send the viewing angle switching signal or the viewing angle adjustment signal to the liquid crystal display device. The viewing angle control button 60 may be a physical button (see FIG. 7a), or may be a virtual button by a software control or an application (APP) to implement the switching function (see FIG. 7b, the viewing angle is set by a slider bar). Under normal conditions, no bias voltage is applied to the first electrode 115, and the liquid crystal display device works in a wide viewing angle mode. When it is needed to switch to the narrow viewing angle mode for the protection of privacy, the user can operate the viewing angle control button 60 to send a viewing angle switching signal or a viewing angle adjustment signal, to thereby easily switch the viewing angle or adjust the viewing angle. When the narrow viewing angle mode is not required, the user can cancel the alternating voltage applied to the first electrode 115 by operating the viewing angle control button 60 again, thereby returning back to the wide viewing angle mode. Therefore, the viewing angle switchable liquid crystal display device of the embodiment of the present application has good operational flexibility and convenience.

Further, in the display process, the display control module 40 is further used to detect the images displayed on the display panel 10, and automatically outputs a viewing angle adjustment signal to the viewing angle control module 50 according to the detecting result. According to the synchronization signal, when a next frame following a current frame on which a viewing angle adjustment signal is received starts to display, the viewing angle control module 50 changes the waveform, the amplitude or the frequency of the periodic alternating voltage applied to the first electrode 115, to further realize automatic monitoring and dynamic adjustment of the image quality besides the switching between wide and narrow viewing angles. For example, after the alternating voltage with a certain waveform has been applied to the first electrode 115 to realize a narrow viewing angle mode, if the external environment changes, the display control module 40 detects the contrast of displayed images in the narrow viewing angle mode by the alternating voltage waveform is not in coincidence with the current display requirement (such as the contrast is too low and the image cannot be seen in the narrow viewing angle mode), then the display control module 40 can automatically output a viewing angle adjustment signal to the viewing angle control module 50 according to the detecting result that the contrast is low, and the viewing angle control module 50 changes the waveform, the amplitude or the frequency of the alternating voltage applied to the first electrode 115 according to the viewing angle adjustment signal, to increase the contrast of the displayed images, to realize automatic monitoring and dynamic adjustment of the displayed images, and maintaining a better display quality for the images.

Referring to FIG. 5, the liquid crystal display device further includes a waveform storage module 70 for storing different alternating voltage waveforms used for switching the viewing angle. When outputting an alternating voltage for switching the viewing angle to the first electrode 115, the viewing angle control module 50 may select a corresponding alternating voltage waveform from the waveform storage module 70 and output it to the first electrode 115.

Figure 8C:
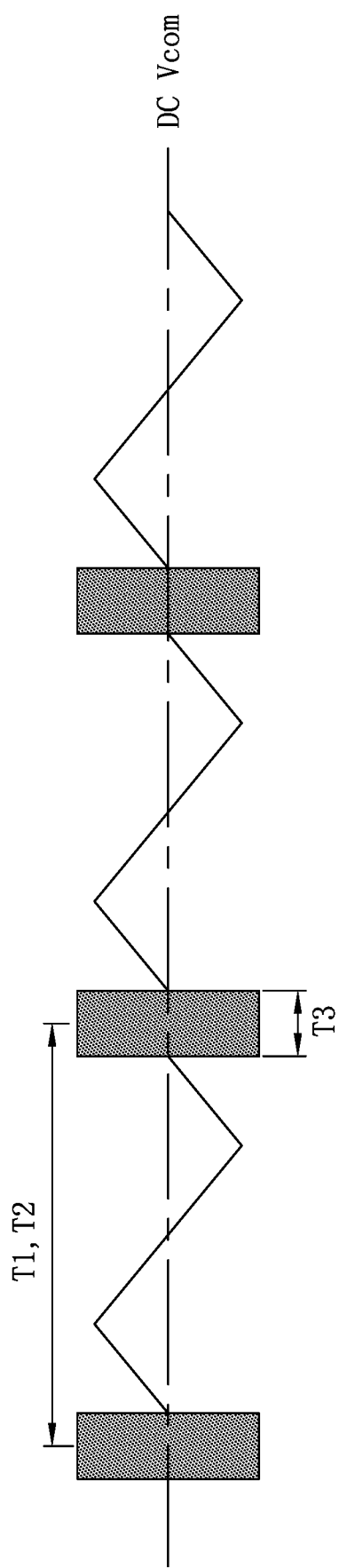
Figure 8D:
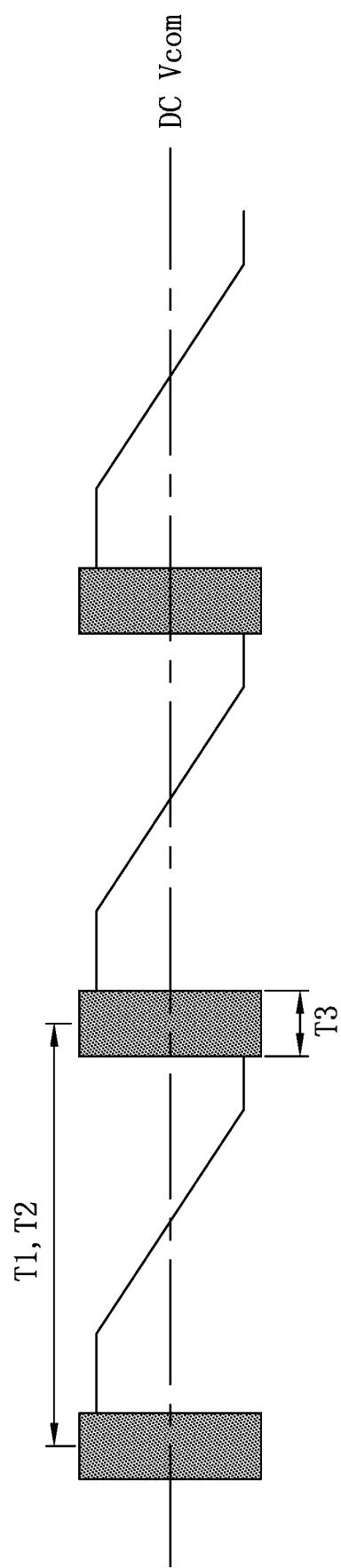

FIG. 8a to FIG. 8e are waveforms of an alternating voltage outputted to the first electrode in different examples of the present application. Referring to FIG. 8a to FIG. 8e, the alternating voltage outputted to the first electrode 115 is a periodic alternating waveform, and the waveform may specifically be a square wave (FIG. 8a), a sine wave (FIG. 8b and FIG. 8e), a triangular wave (FIG. 8c), or a saw-tooth wave (FIG. 8d). In this embodiment, the display period of each frame is T1 (e.g., when the refresh frequency is 60 Hz, the display period T1 of each frame is 1/60 second), and the period of the alternating voltage waveform outputted to the first electrode 115 is T2. The period T2 of the alternating voltage waveform outputted to the first electrode 115 may be 0.5 or $2^n$ times (2 n-th power) of the display period T1 of each frame, where n=0, 1, 2, 4, 8 . . . .

As shown in FIG. 8a, the period T2 of the alternating voltage waveform outputted to the first electrode 115 is twice the display period T1 of each frame, that is, T2=2*T1. In other words, the frequency of the alternating voltage waveform outputted to the first electrode 115 is half of the refresh frequency of the images.

As shown in FIG. 8b to FIG. 8d, the period T2 of the alternating voltage waveform outputted to the first electrode 115 is equal to the display period T1 of each frame, that is, T2=T1. The frequency of the alternating voltage waveform outputted to the first electrode 115 is equal to the refresh frequency of the images.

Figure 8E:
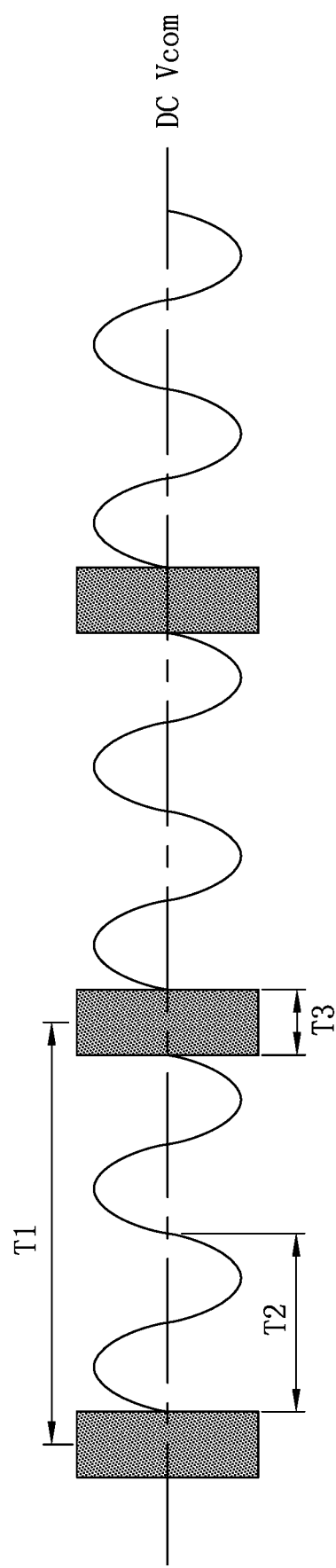

As shown in FIG. 8e, the period T2 of the alternating voltage waveform outputted to the first electrode 115 is half of the display period T1 of each frame, that is, T2=0.5*T1. In other words, the frequency of the alternating voltage waveform outputted to the first electrode 115 is twice of the refresh frequency of the images.

In addition, a blanking time T3 may be arranged between two adjacent frames, and the blanking time T3 is a transition time period between adjacent frames. The alternating voltage and its waveform applied to the first electrode 115 during the blanking time T3 is not limited.

Referring to FIG. 5, the viewing angle control module 50 is further used to output a direct current common voltage (i.e., DC Vcom) to the second electrode 124, and the alternating voltage outputted to the first electrode 115 fluctuates around the direct current common voltage (DC Vcom), as shown in FIG. 8a to FIG. 8e.

Figure 9:
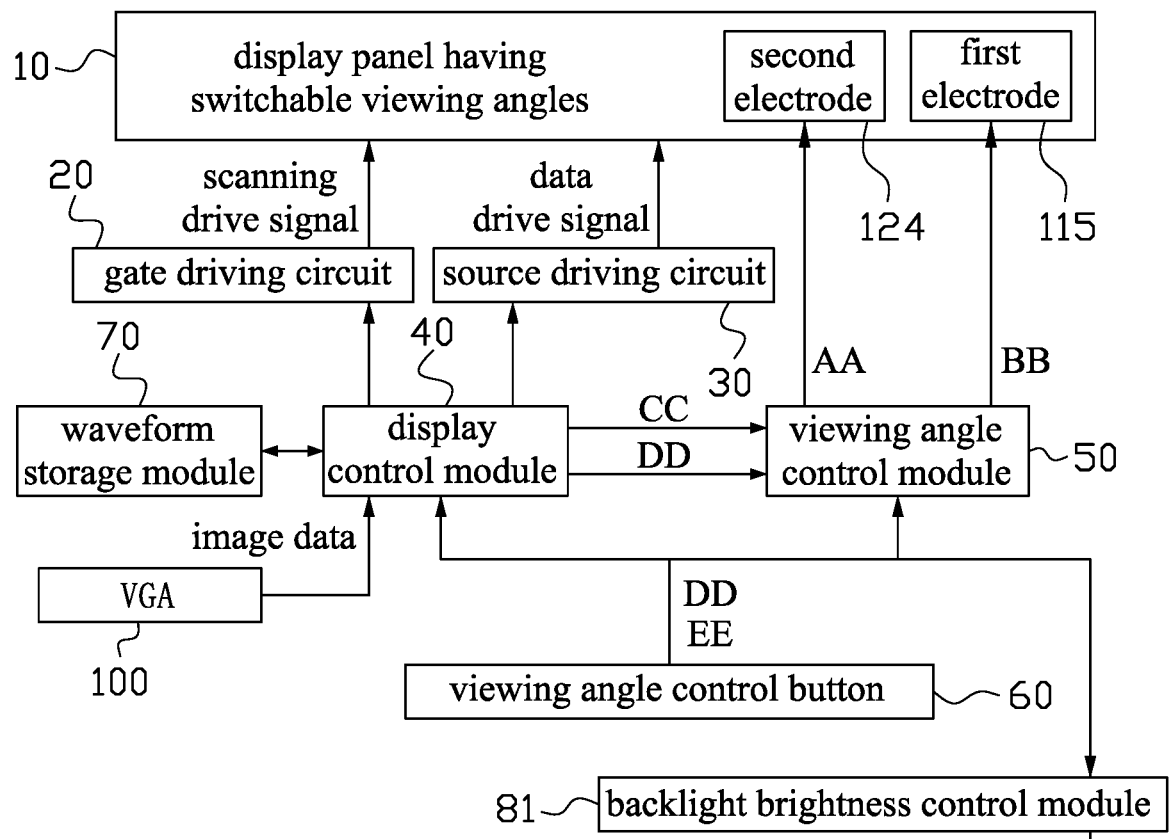
FIG. 9 is another block diagram of the working principle of the liquid crystal display device of FIG. 1.

FIG. 9 is another block diagram showing the working principle of the liquid crystal display device of FIG. 1. FIG. 9 is different from FIG. 5 in that the liquid crystal display device further includes a backlight 82 and a backlight brightness control module 81. The viewing angle switching signal or the viewing angle adjustment signal is further provided to the backlight brightness control module 81. The backlight brightness control module 81 automatically adjusts the brightness of the backlight 82 according to the viewing angle switching signal or the viewing angle adjustment signal. For example, when the display panel 10 is switched from the wide viewing angle mode to the narrow viewing angle mode, the brightness of the display panel 10 may be lowered due to the light leakage phenomenon under the narrow viewing angle mode. Thus, the brightness of the backlight 82 may be controlled by the backlight brightness control module 81, such that the brightness of the display panel 10 does not change obviously in the narrow viewing angle mode. Therefore, in the switching of wide and narrow viewing angles, this embodiment can also realize automatic adjustment of the brightness of the backlight 82 due to driving control of backlight, to reach a balance between the display effect under the wide and narrow viewing angles and the backlight power consumption.

As shown in FIG. 1, in order to apply the alternating bias voltage to the first electrode 115 of the first substrate 11, the first electrode 115 can be electrically conducted from the first substrate 11 to the second substrate 12 through a conductive paste 90 in the peripheral non-display region. The alternating bias voltage is supplied from the viewing angle control module 50 firstly to the second substrate 12, and then is applied from the second substrate 12 to the first electrode 115 of the first substrate 11 through the conductive paste 90. Therefore, the second overcoat layer 117 is defined with a through hole 117a in the peripheral non-display region to expose the first electrode 115, for facilitating the electrical connection of the conductive paste 90 to the first electrode 115 through the through hole 117a.

Due to the inherent characteristics of the liquid crystal molecules, the long-term application of a direct current voltage will cause polarization problems for the liquid crystal molecules. In this embodiment, the bias voltage applied to the first electrode 115 is an alternating current voltage, to thereby avoid long-term application of a direct current voltage on the first electrode 115 to cause polarization of the liquid crystal molecules, and the use of an alternating voltage can also prevent the impurity ions in the liquid crystal layer 13 from being concentrated on either side of the first substrate 11 or the second substrate 12. It may effectively improve the image sticking problem under normal display.

In the embodiment of the present application, the first electrode 115 for controlling the switching of the viewing angle is provided on the first substrate 11. The first electrode 115 is made of a material such as ITO. When a bias voltage is applied to the first electrode 115, the resistance of the ITO material is large and the loading of the first electrode 115 is large, which is prone to cause mura problems in individual images. In this embodiment, by providing the metal conductive layer 116 in direct conductive contact with the first electrode 115, the plurality of metal conductive strips 116a of the metal conductive layer 116 are distributed throughout the whole display area and are in direct conductive contact with the first electrode 115, and the metal conductive strips 116a may serve as an auxiliary conductive connection for the first electrode 115, to greatly improve the conductivity of the first electrode 115 and reduce the resistance load of the first electrode 115, thereby solving the problem of mura caused by the large resistance load of the first electrode 115. Moreover, the metal conductive strips 116a are disposed and overlapped with the black matrix 113, thereby not affecting the aperture ratio and the transmittance of the pixel.

Second Embodiment

Figure 10:
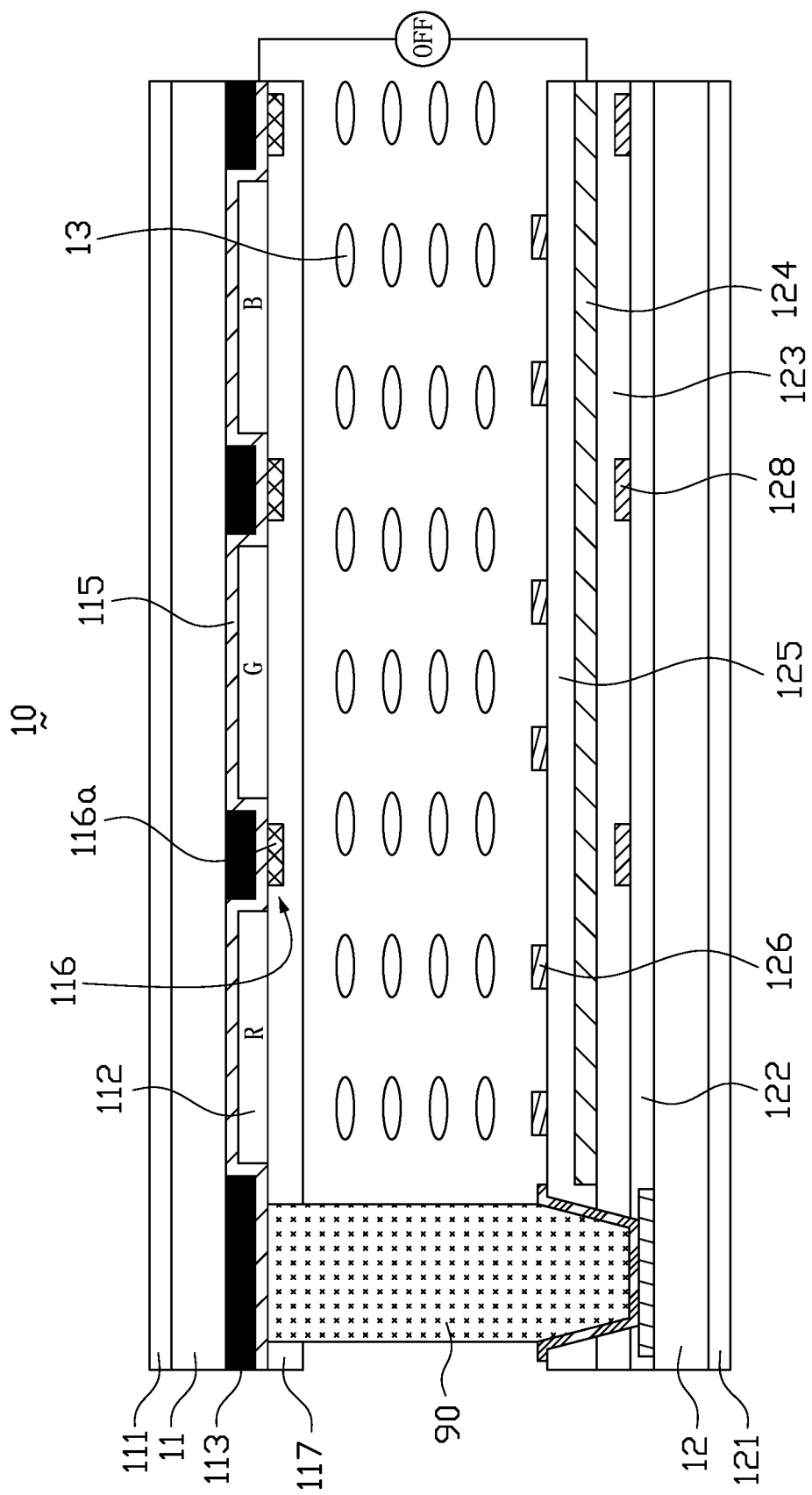
FIG. 10 is a schematic view of a liquid crystal display device according to a second embodiment of the present application.

FIG. 10 is a schematic view of a liquid crystal display device according to a second embodiment of the present application. Referring to FIG. 10, the main difference between this embodiment and the above first embodiment is in the structure of the first substrate 11. In this embodiment, the first substrate 11 is provided with a color filter layer 112, a black matrix (BM) 113, a first electrode 115, a metal conductive layer 116 and an overcoat layer 117 on the surface facing towards the liquid crystal layer 13. The black matrix 113 is formed on the surface of the first substrate 11 facing towards the liquid crystal layer 13. The first electrode 115 is formed on the black matrix 113. The color filter layer 112 is formed on the first electrode 115 and staggered from the black matrix 113. The metal conductive layer 116 is formed on the first electrode 115 and overlapped with the black matrix 113. The overcoat layer 117 covers the metal conductive layer 116 and the color filter layer 112.

Compared with the above first embodiment, the manufacturing order of the first electrode 115 is adjusted in this embodiment, such that the first electrode 115 is interposed between the black matrix 113 and the color filter layer 112. It has been experimentally verified that the liquid crystal display device of this embodiment can improve the transmittance by about 8.74% compared with the above first embodiment due to the adjustment of the layers. For other structures of this embodiment, reference may be made to the above first embodiment, and details are omitted herein for clarity.

Third Embodiment

Figure 11:
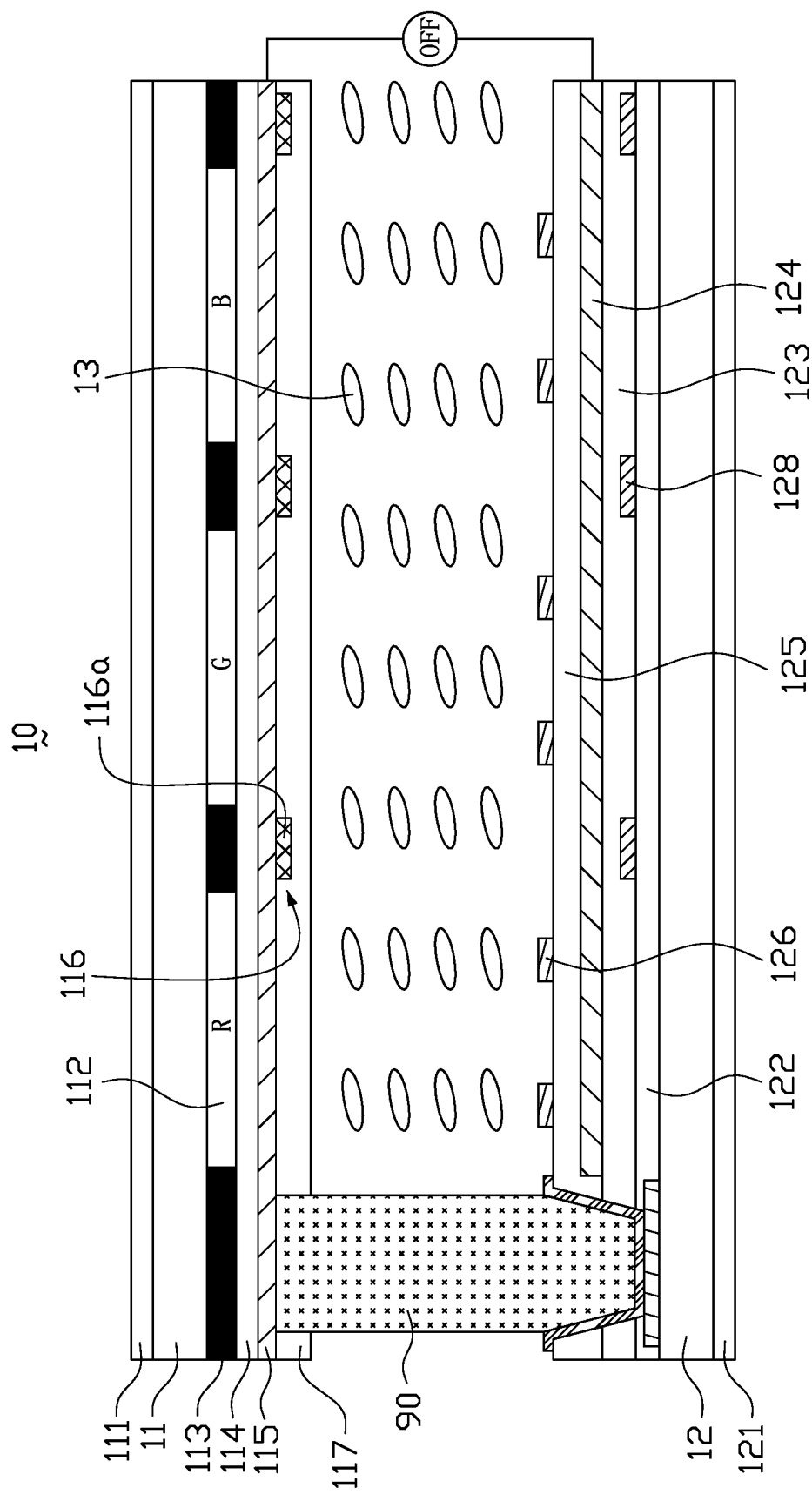
FIG. 11 is a schematic view of a liquid crystal display device in a narrow viewing angle mode according to a third embodiment of the present application.
Figure 12:
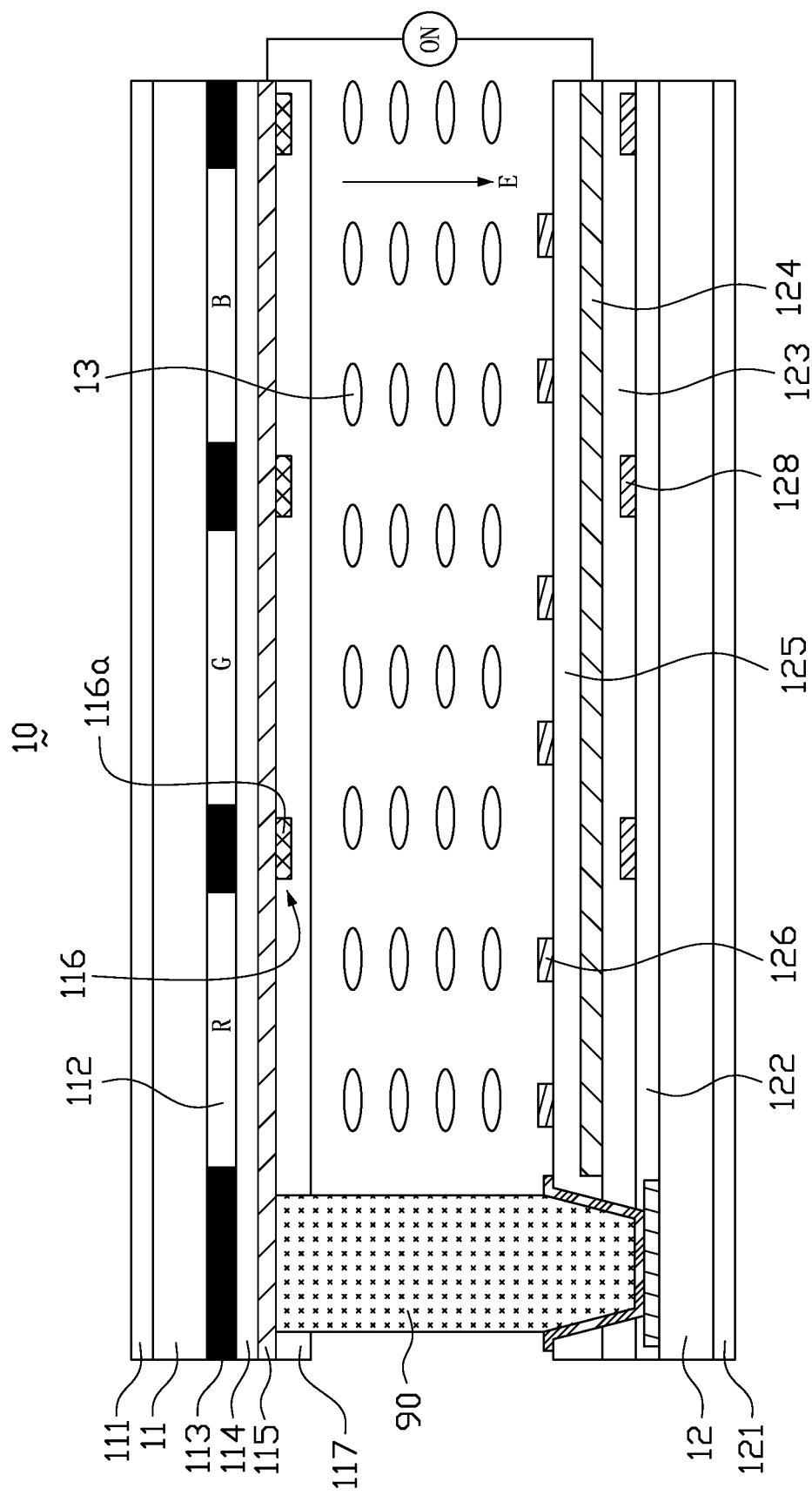
FIG. 12 is a schematic view of the liquid crystal display device of FIG. 11 in a wide viewing angle mode.

FIG. 11 is a schematic view of a liquid crystal display device in a narrow viewing angle mode according to a third embodiment of the present application, and FIG. 12 is a schematic view of the liquid crystal display device of FIG. 11 in a wide viewing angle mode. Referring to FIG. 11 and FIG. 12, the main difference between this embodiment and the above first embodiment is in that the liquid crystal layer 13 in this embodiment employs negative liquid crystal molecules. In the initial state (i.e., no voltage is applied to the display panel 10), the negative liquid crystal molecules in the liquid crystal layer 13 have an initial pretilt angle with respect to the substrates 11, 12. That is, the negative liquid crystal molecules assume a tilting posture with respect to the substrates 11, 12 (see FIG. 11). Due to the anchoring action of alignment films (not shown), the negative liquid crystal molecules can be maintained with a tilting posture in the initial state with no any voltage being applied to the display panel 10. Under the action of an electric field generated by a voltage, the long axis of the negative liquid crystal molecules will deflect towards a direction perpendicular to the direction of the electric field lines.

Referring to FIG. 11, when nearly no bias voltage is applied to the first electrode 115 (including the cases in which a small bias voltage is applied, such as less than 0.5V), since the pretilt angle of the liquid crystal molecules in the liquid crystal layer 13 is relatively large, the light passing through the liquid crystal molecules in the squint direction of the display panel 10 is not matched with the upper and lower polarizers 111, 121 due to phase delay, and a light leakage occurs. When the display panel 10 is viewed from the squint direction, the contrast of the screen is lowered to affect the viewing effect, and the viewing angle is reduced, thereby achieving a narrow viewing angle mode.

Referring to FIG. 12, when a bias voltage with a certain value is applied to the first electrode 115, a voltage difference exists between the first electrode 115 of the first substrate 11 and the second electrode 124 of the second substrate 12, and a vertical electric field is formed between the two substrates 11, 12 (as indicated by the arrow E). Since the negative liquid crystal molecules will deflect towards a direction perpendicular to the electric field lines under an electric field, the negative liquid crystal molecules are deflected under the action of the vertical electric field, to reduce the tilt angle between the liquid crystal molecules and the substrates 11, 12. When the tilt angle of the liquid crystal molecules is reduced to be substantially parallel to the substrates 11, 12, the light leakage phenomenon is reduced in the squint direction of the display panel 10, the viewing angle of the display panel 10 is increased accordingly, to achieve a wide viewing angle mode.

For other structures of this embodiment, reference may be made to the above first embodiment, and details are omitted herein for clarity.

Fourth Embodiment

Figure 13:
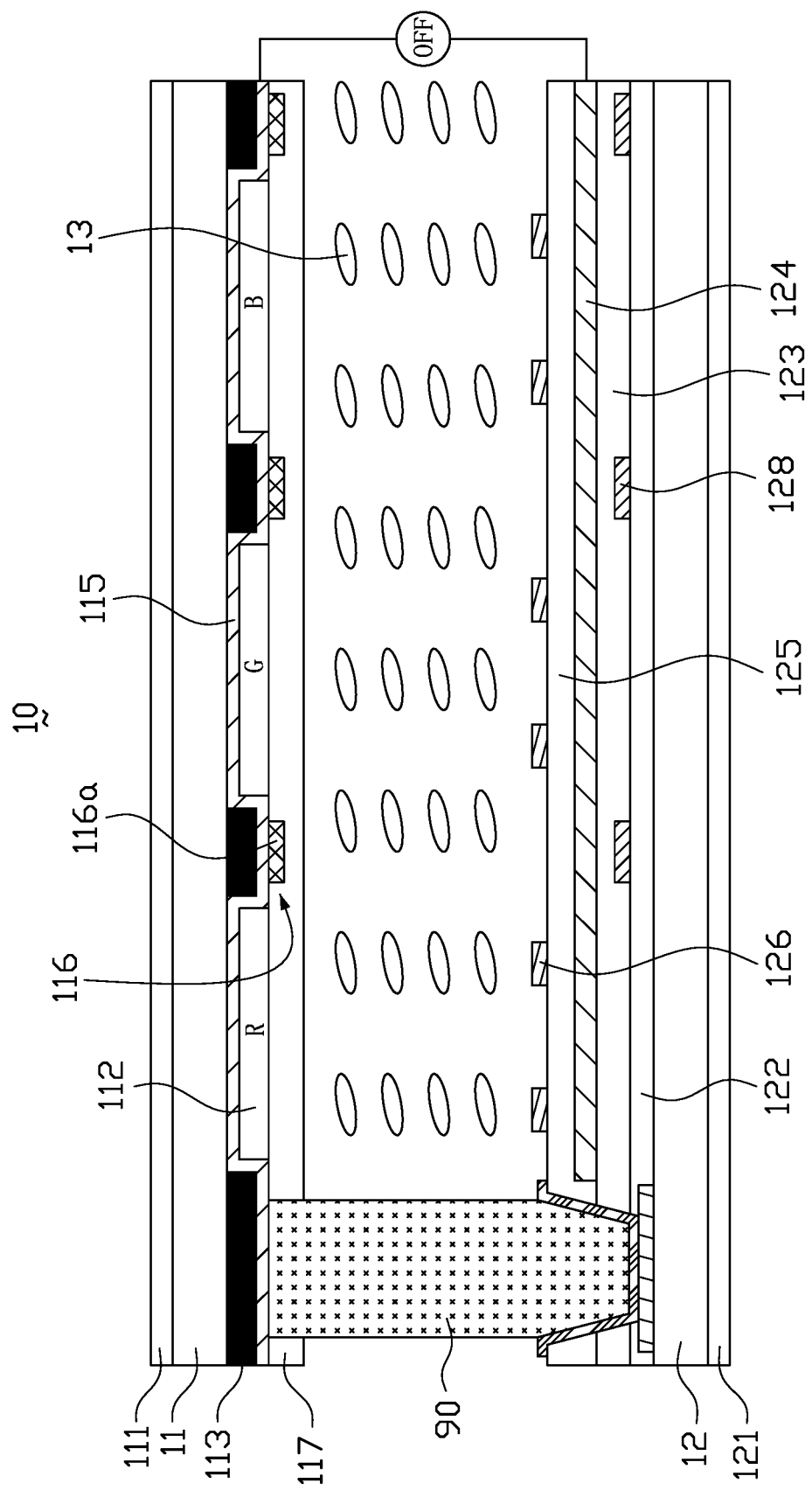
FIG. 13 is a schematic view of a liquid crystal display device according to a fourth embodiment of the present application.

FIG. 13 is a schematic view of a liquid crystal display device according to a fourth embodiment of the present application. Referring to FIG. 13, the main difference between this embodiment and the above first embodiment is in the adjustment of manufacturing order of the first electrode 115 (see the description of the second embodiment in FIG. 10) and the use of negative liquid crystal molecules (see the description of the third embodiment in FIG. 11 and FIG. 12). For the specific structures of this embodiment, reference may be made to the above first embodiment to the above third embodiment, and details are omitted herein for clarity.

Fifth Embodiment

A fifth embodiment of the present application further provides a viewing angle switching method for switching the viewing angle of the liquid crystal display device described above. The viewing angle switching method includes:

outputting a periodic alternating voltage for switching the viewing angle to the first electrode 115 of the first substrate 11 when a next frame following a current frame on which a viewing angle switching signal is received starts to display.

Further, the viewing angle switching method further includes: changing the waveform, the magnitude, or the frequency of the alternating voltage applied to the first electrode 115 when a next frame following a current frame on which a viewing angle adjustment signal is received starts to display, to thereby meet the user's self-adjustment needs for the viewing angle and improve the user satisfaction.

Further, the liquid crystal display device is provided with a viewing angle control button 60, and the viewing angle switching signal or the viewing angle adjustment signal is sent from the user to the liquid crystal display device through the viewing angle control button 60, to easily realize the switching between wide viewing angle and narrow viewing angle with good operational flexibility and convenience.

Further, the viewing angle switching method further includes: detecting the images displayed on the display panel 10, and automatically generating a viewing angle adjustment signal according to the detecting result, to thereby realize automatic monitoring and dynamic adjustment of the displayed images, and maintaining a better display quality for the images.

Further, the viewing angle switching method further includes: outputting a direct current common voltage to the second electrode 124, and the alternating voltage outputted to the first electrode 115 fluctuates around the direct current common voltage. By applying the alternating voltage to the first electrode 115, it can effectively improve the image sticking problem while realizing switching wide and narrow viewing angles.

The viewing angle switching method of this embodiment has the same concept as the liquid crystal display device in the above embodiments. For more details about the viewing angle switching method, reference may be made to the descriptions relating to the liquid crystal display device, and details are omitted herein for clarity.

In the liquid crystal display device having switchable viewing angles and the viewing angle switching method provided by the embodiments of the present application, the first electrode for controlling the viewing angle is provided on the first substrate, and by applying an alternating bias voltage to the first electrode, the display panel can switch between wide and narrow viewing angles. When receiving a viewing angle switching signal from the user, it is waited until the display of the current frame is finished according to the synchronization signal provided by the display control module. When a next frame following the current frame starts to display, a periodic alternating voltage for switching viewing angle is applied to the first electrode, for realizing the switching of the viewing angle. Since the viewing angle is switched at the beginning of display of one frame, the voltage on the first electrode is constant on each frame, to avoid voltage inconsistency on the first electrode between the first half and the second half of a frame, so that problems such as flicker and mura caused by sudden change of voltage on the first electrode are eliminated. The embodiments of the present application can easily realize switching between wide and narrow viewing angles with good operational flexibility and convenience, without the need to use a shielding film and without increasing the product thickness and the manufacturing cost. Thus, a multi-functional liquid crystal display device with the advantages of entertainment use and privacy protection is obtained.

The above are only the preferred embodiments of the present application, and are not intended to limit the present application. Any modifications, equivalents, improvements, etc., which are within the spirit and scope of the present application, should be included in the scope of the present application.

INDUSTRIAL APPLICABILITY

In the embodiments of the present application, the first electrode for controlling the viewing angle is provided on the first substrate, and by applying an alternating bias voltage to the first electrode, the display panel can switch between wide and narrow viewing angles. When receiving a viewing angle switching signal from the user, it is waited until the display of the current frame is finished according to the synchronization signal provided by the display control module. When a next frame following the current frame starts to display, a periodic alternating voltage for switching viewing angle is applied to the first electrode, for realizing the switching of the viewing angle. Since the viewing angle is switched at the beginning of display of one frame, the voltage on the first electrode is constant on each frame, to avoid voltage inconsistency on the first electrode between the first half and the second half of a frame, so that problems such as flicker and mura caused by sudden change of voltage on the first electrode are eliminated. The embodiments of the present application can easily realize switching between wide and narrow viewing angles with good operational flexibility and convenience, without the need to use a shielding film and without increasing the product thickness and the manufacturing cost. Thus, a multi-functional liquid crystal display device with the advantages of entertainment use and privacy protection is obtained.

What is claimed is:

1. A liquid crystal display device having switchable viewing angles, comprising a display panel and a display control module, the display panel comprising a first substrate, a second substrate disposed opposite to the first substrate, and a liquid crystal layer disposed between the first substrate and the second substrate, the display control module being used to control the display panel to display images, wherein the first substrate is provided with a first electrode, the second substrate is provided with a second electrode and a third electrode, the liquid crystal display device further comprises a viewing angle control module, the display control module is further used to provide a synchronization signal to the viewing angle control module, and according to the synchronization signal, when a next frame following a current frame on which a viewing angle switching signal is received starts to display, the viewing angle control module outputs a periodic alternating voltage for switching viewing angle to the first electrode;

wherein the second substrate is provided with scanning lines and data lines, wherein a plurality of scanning lines and a plurality of data lines intersect with each other to define a plurality of sub-pixel regions, the first substrate is further provided with a metal conductive layer, the metal conductive layer comprises a plurality of metal conductive strips, and the metal conductive strips are in direct conductive contact with the first electrode.

2. The liquid crystal display device having switchable viewing angles of claim 1, wherein according to the synchronization signal, when a next frame following a current frame on which a viewing angle adjustment signal is received starts to display, the viewing angle control module further changes the waveform, the amplitude or the frequency of the periodic alternating voltage applied to the first electrode.

3. The liquid crystal display device having switchable viewing angles of claim 2, wherein the liquid crystal display device is provided with a viewing angle control button for a user to send a viewing angle switching signal or a viewing angle adjustment signal to the liquid crystal display device.

4. The liquid crystal display device having switchable viewing angles of claim 3, wherein the viewing angle control button is a physical button or a virtual button.

5. The liquid crystal display device having switchable viewing angles of claim 2, wherein the liquid crystal display device further comprises a backlight and a backlight brightness control module, and the backlight brightness control module automatically adjusts the brightness of the backlight according to the viewing angle switching signal or the viewing angle adjustment signal.

6. The liquid crystal display device having switchable viewing angles of claim 2, wherein the display control module is further used to detect the images displayed on the display panel, and automatically outputs a viewing angle adjustment signal to the viewing angle control module according to the detecting result.

7. The liquid crystal display device having switchable viewing angles of claim 1, wherein the viewing angle control module is further used to output a direct current common voltage to the second electrode, and the alternating voltage outputted to the first electrode fluctuates around the direct current common voltage.

8. The liquid crystal display device having switchable viewing angles of claim 1, wherein a period of the alternating voltage outputted to the first electrode is 0.5 or $2^n$ times of the display period of each frame, wherein n=0, 1, 2, 4, 8.

9. The liquid crystal display device having switchable viewing angles of claim 1, wherein the alternating voltage outputted to the first electrode is a square wave, a sine wave, a triangular wave or a saw-tooth wave.

10. The liquid crystal display device having switchable viewing angles of claim 1, wherein the liquid crystal display device further comprises a waveform storage module for storing different alternating voltage waveforms, when outputting an alternating voltage to the first electrode, the viewing angle control module selects a corresponding alternating voltage waveform from the waveform storage module and outputs it to the first electrode.

11. The liquid crystal display device having switchable viewing angles of claim 1, wherein the liquid crystal molecules in the liquid crystal layer are positive liquid crystal molecules, and in the initial state, the positive liquid crystal molecules are in a lying posture and the display panel has a wide viewing angle; when the alternating voltage is outputted to the first electrode, the positive liquid crystal molecules are tilted from a lying posture to a tilting posture and the display panel is switched from a wide viewing angle to a narrow viewing angle.

12. The liquid crystal display device having switchable viewing angles of claim 1, wherein the liquid crystal molecules in the liquid crystal layer are negative liquid crystal molecules, and in the initial state, the negative liquid crystal molecules are in an tilted posture and the display panel has a narrow viewing angle; when the alternating voltage is outputted to the first electrode, the negative liquid crystal molecules are tilted from a tilting posture to a lying posture and the display panel is switched from a narrow viewing angle to a wide viewing angle.

13. The liquid crystal display device having switchable viewing angles of claim 1, wherein the first substrate further comprises a color filter layer, a black matrix, a first overcoat layer and a second overcoat layer, the color filter layer and the black matrix are staggered from each other and formed on a surface of the first substrate facing towards the liquid crystal layer, the first overcoat layer covers the color filter layer and the black matrix, the first electrode is formed on the first overcoat layer, the metal conductive layer is formed on the first electrode and overlapped with the black matrix, and the second overcoat layer covers the metal conductive layer.

14. The liquid crystal display device having switchable viewing angles of claim 1, wherein the first substrate further comprises a color filter layer, a black matrix and an overcoat layer, the black matrix is formed on a surface of the first substrate facing towards the liquid crystal layer, the first electrode is formed on the black matrix, the color filter layer is formed on the first electrode and staggered from the black matrix, the metal conductive layer is formed on the first electrode and overlapped with the black matrix, and the overcoat layer covers the metal conductive layer and the color filter layer.

* * * * *